Nov. 5, 1935.  W. FERRIS ET AL  2,019,848
SELF FEEDING PRESS
Filed Oct. 24, 1931   12 Sheets-Sheet 1

INVENTORS
WALTER FERRIS.
JOHN P. FERRIS.
GEORGE L. HEIDEN.
BY
ATTORNEY.

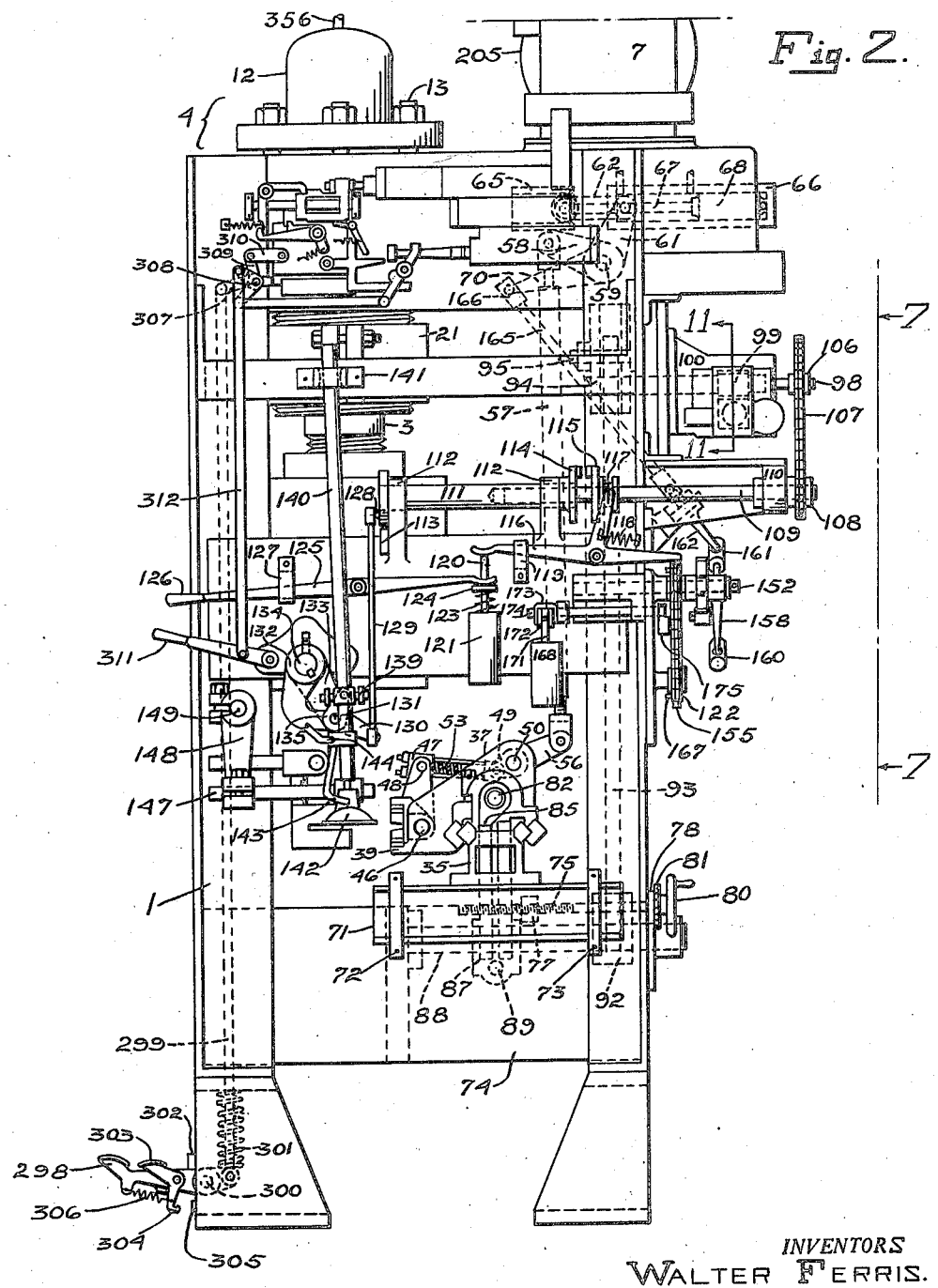

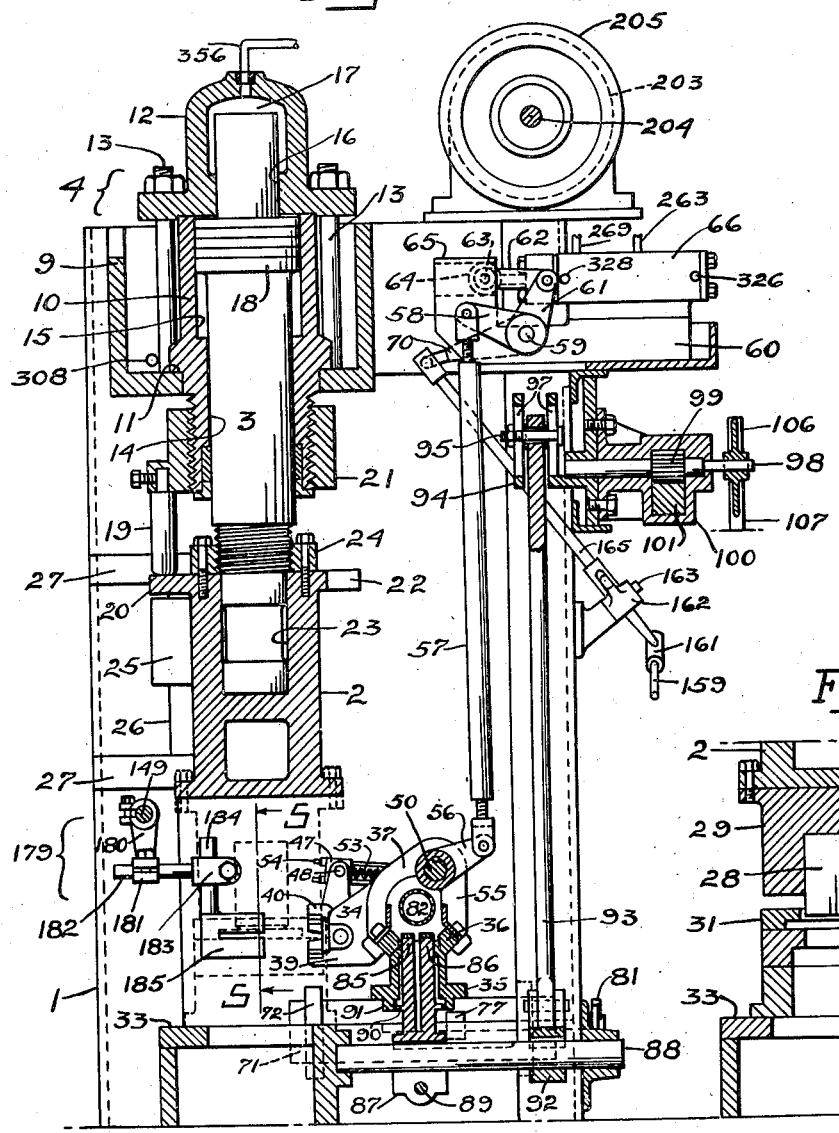

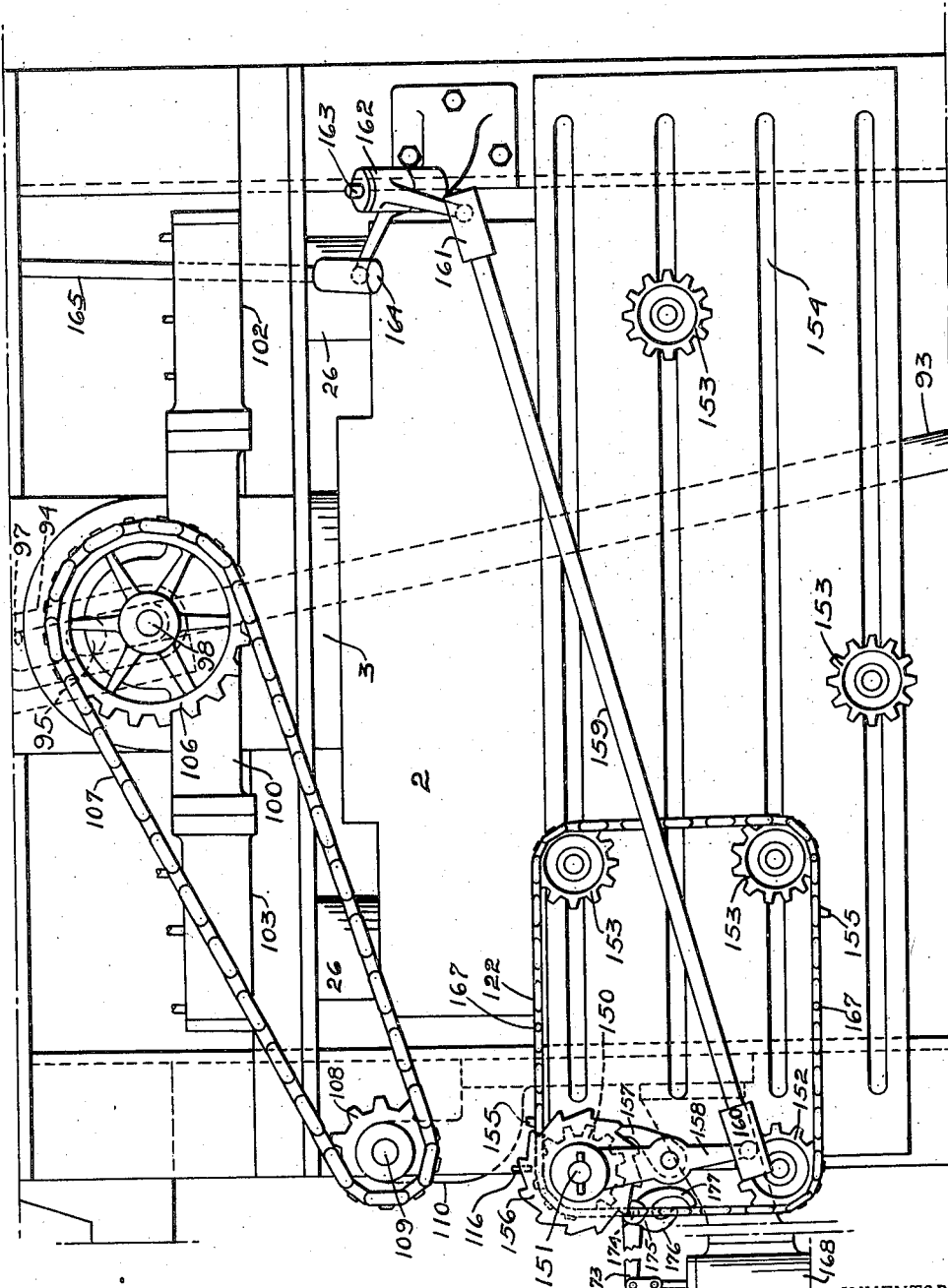

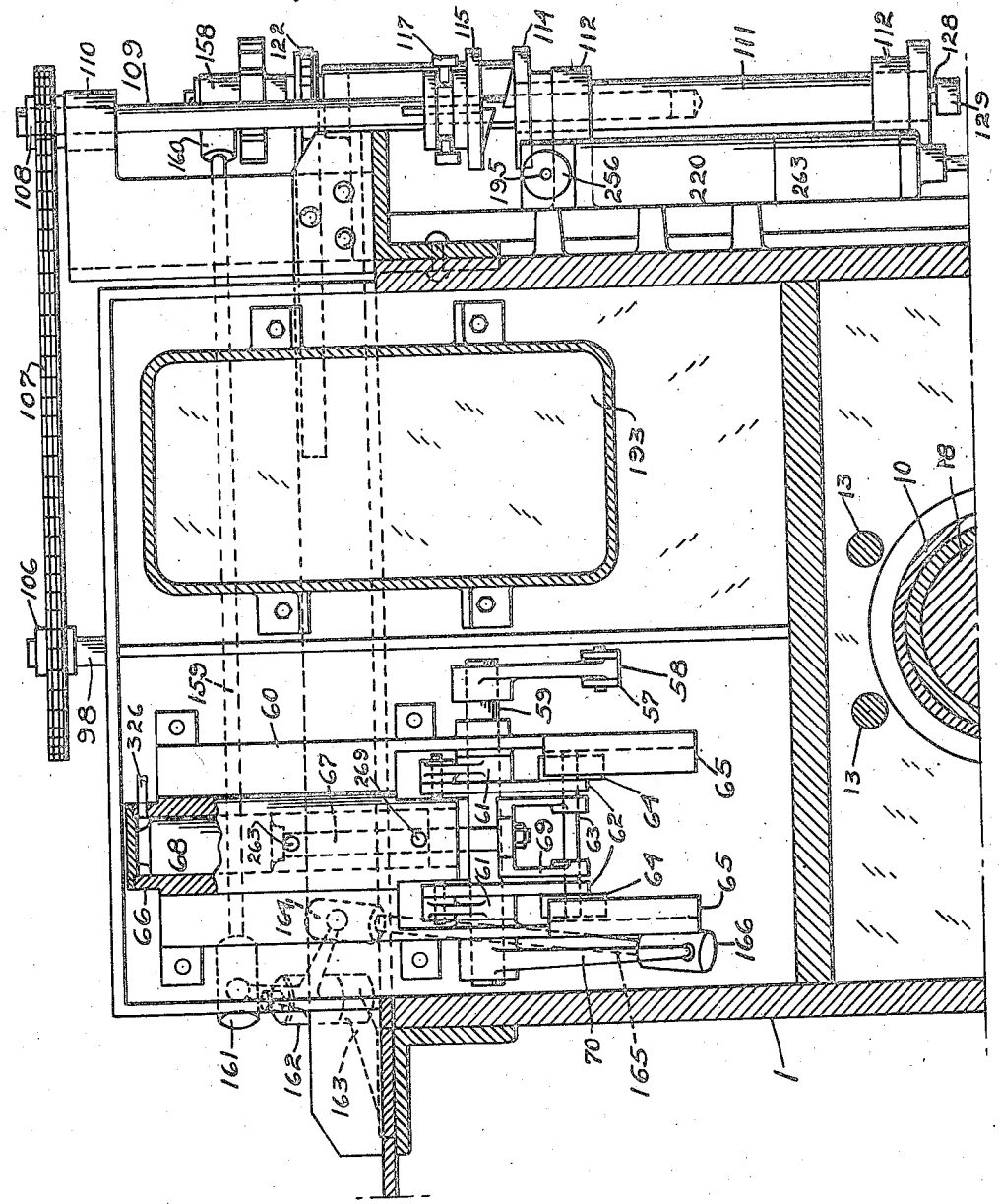

Nov. 5, 1935.    W. FERRIS ET AL    2,019,848
SELF FEEDING PRESS
Filed Oct. 24, 1931    12 Sheets-Sheet 6
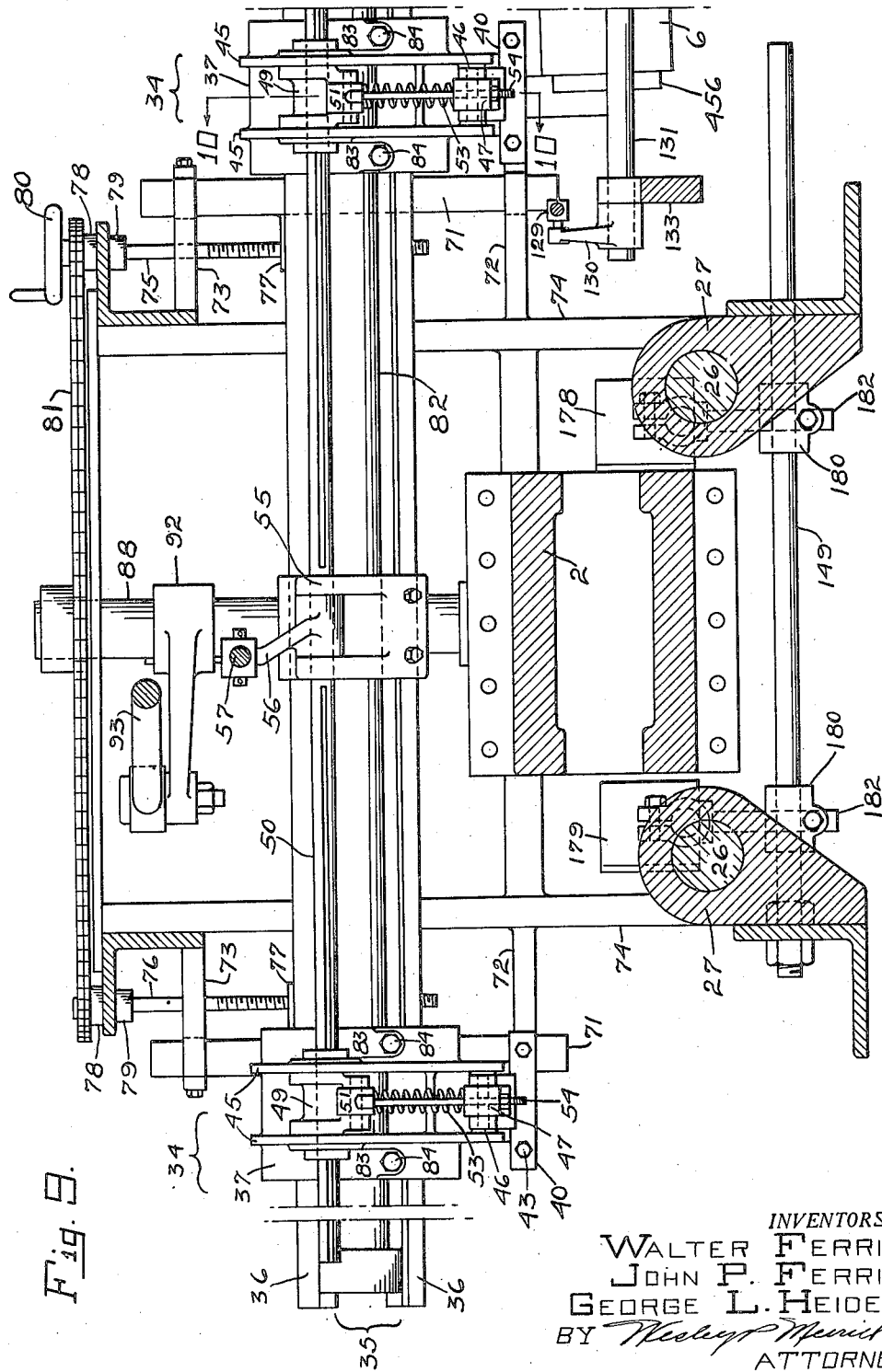
INVENTORS
WALTER FERRIS.
JOHN P. FERRIS.
GEORGE L. HEIDEN.
BY
ATTORNEY.

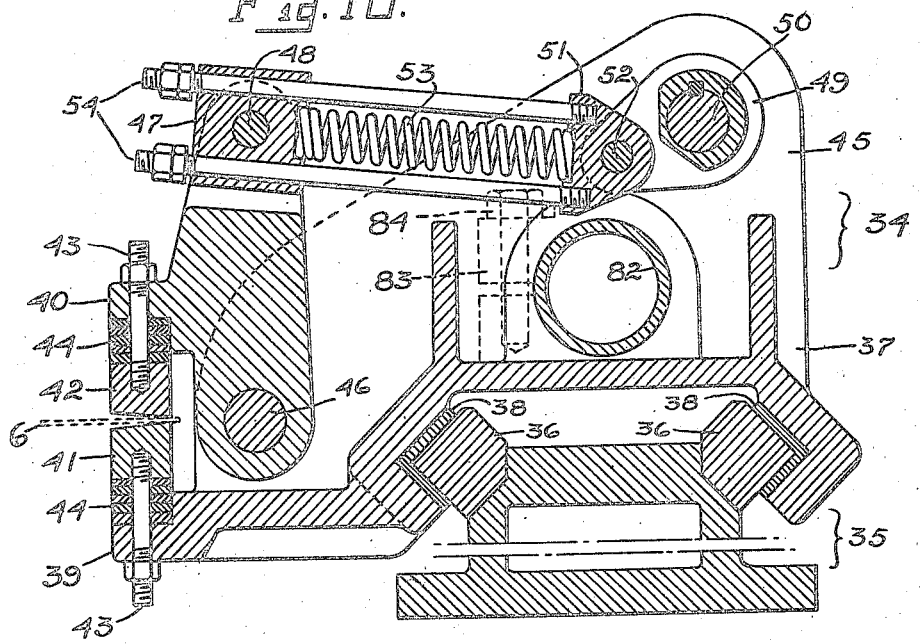
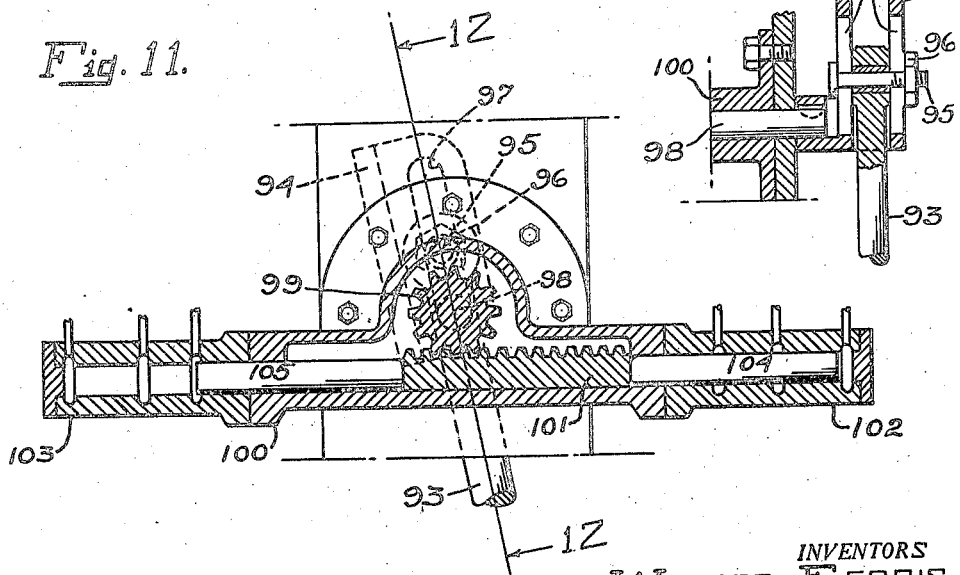

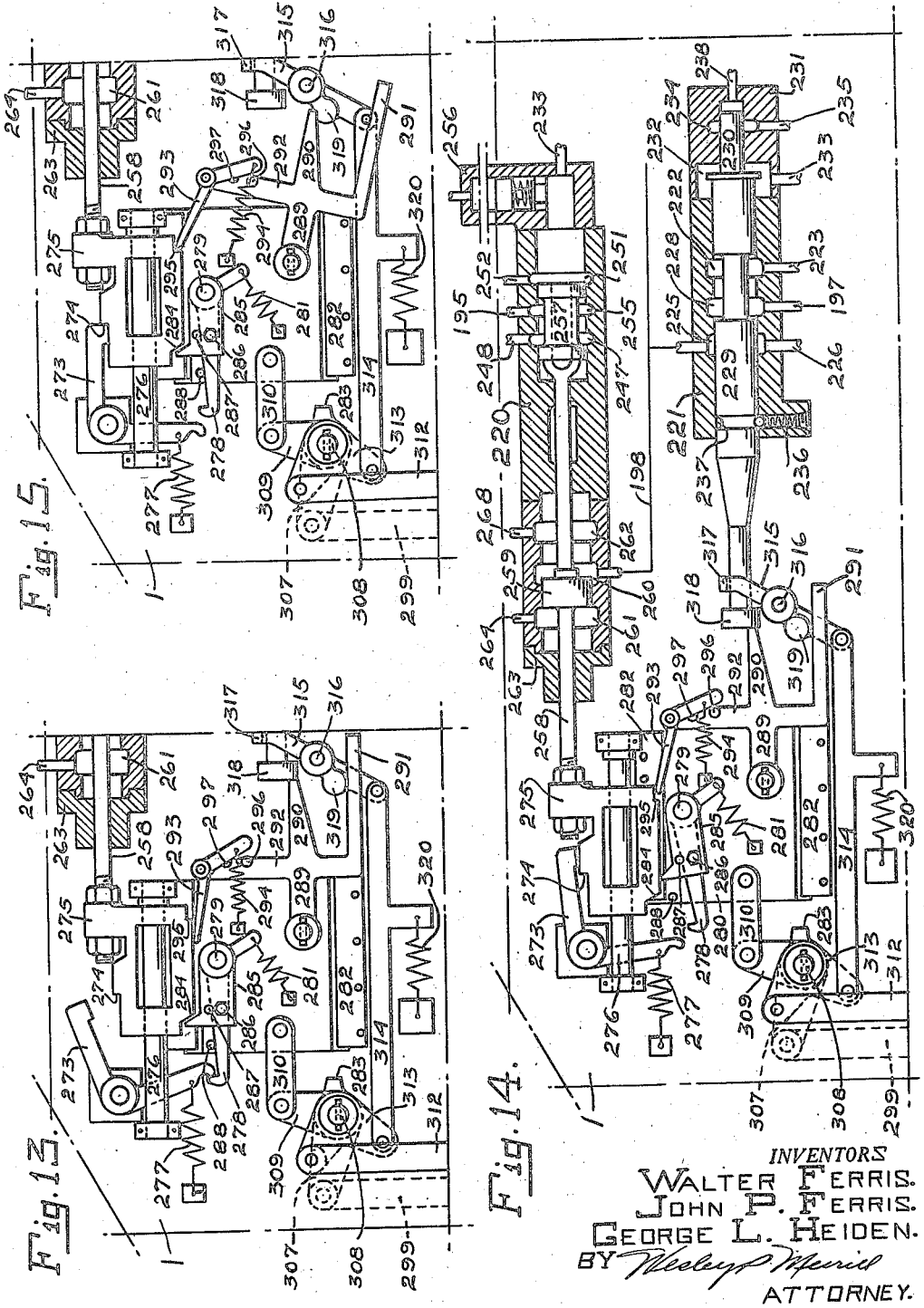

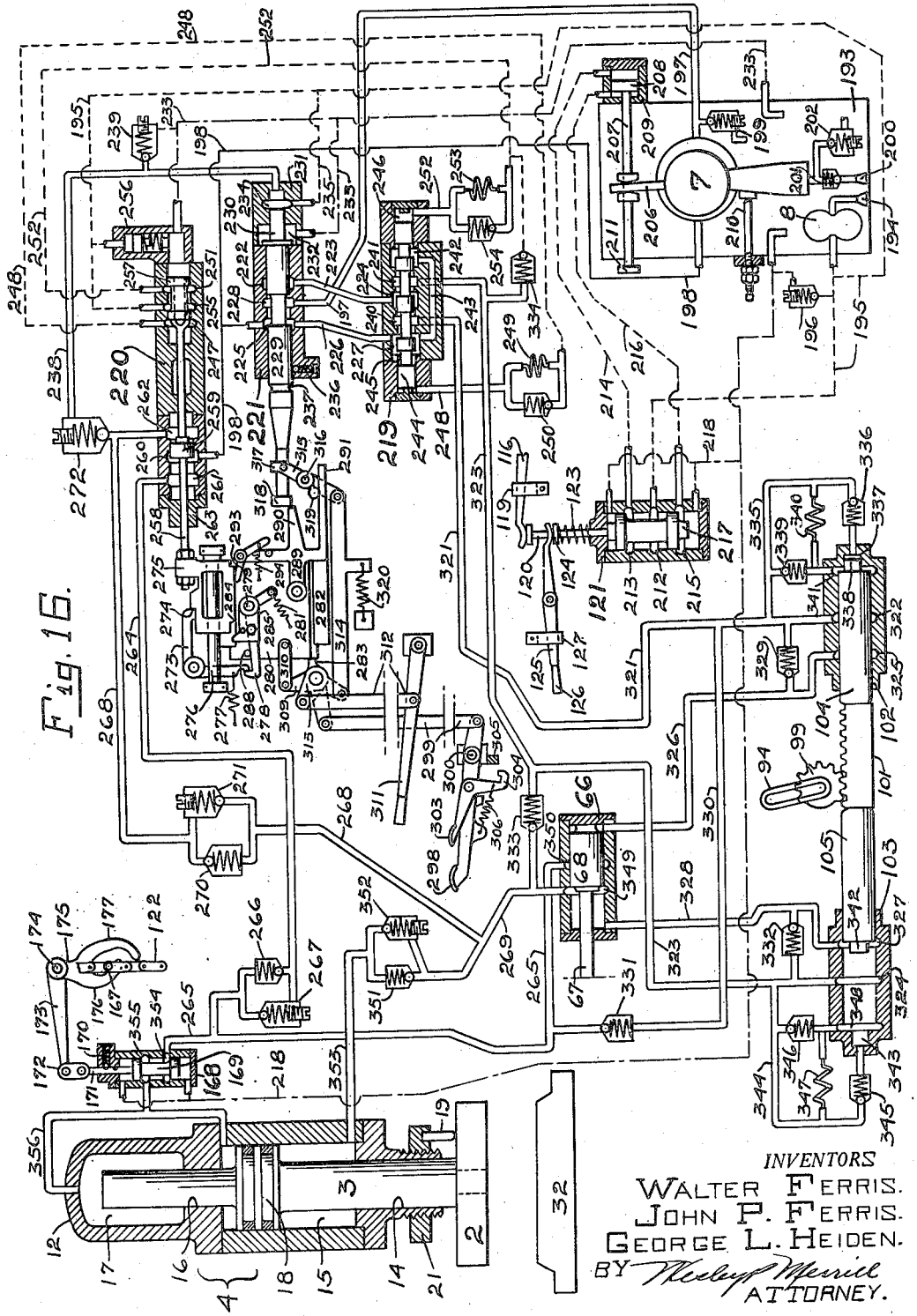

Nov. 5, 1935.     W. FERRIS ET AL     2,019,848
SELF FEEDING PRESS
Filed Oct. 24, 1931     12 Sheets-Sheet 10
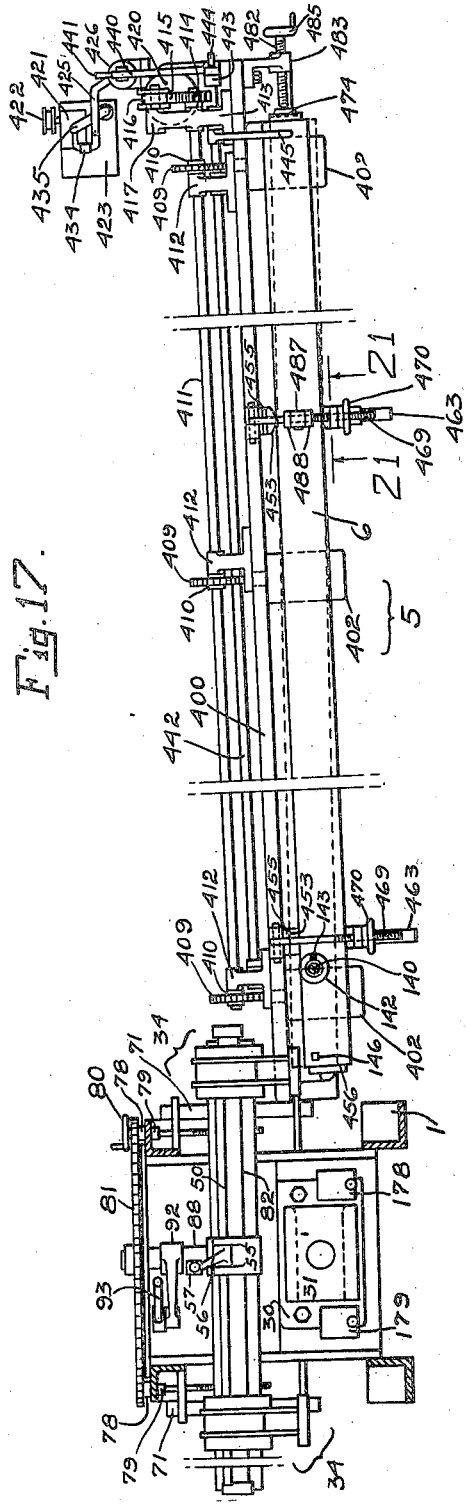
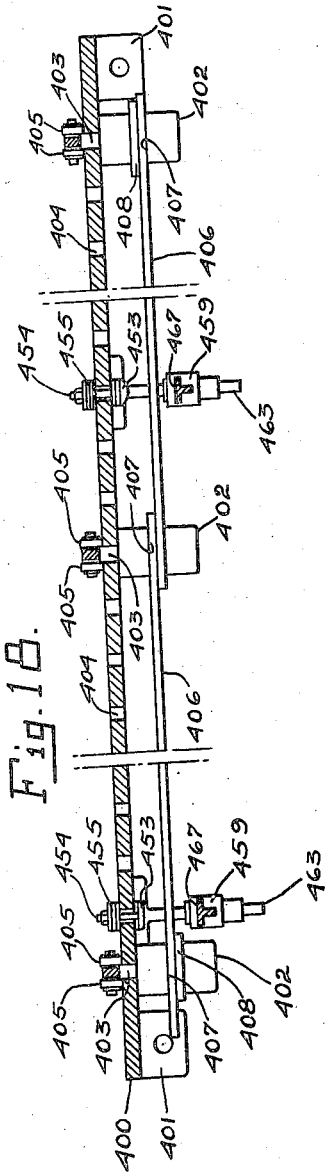
INVENTORS
WALTER FERRIS.
JOHN P. FERRIS.
GEORGE L. HEIDEN.
BY Wesley Merrill
ATTORNEY.

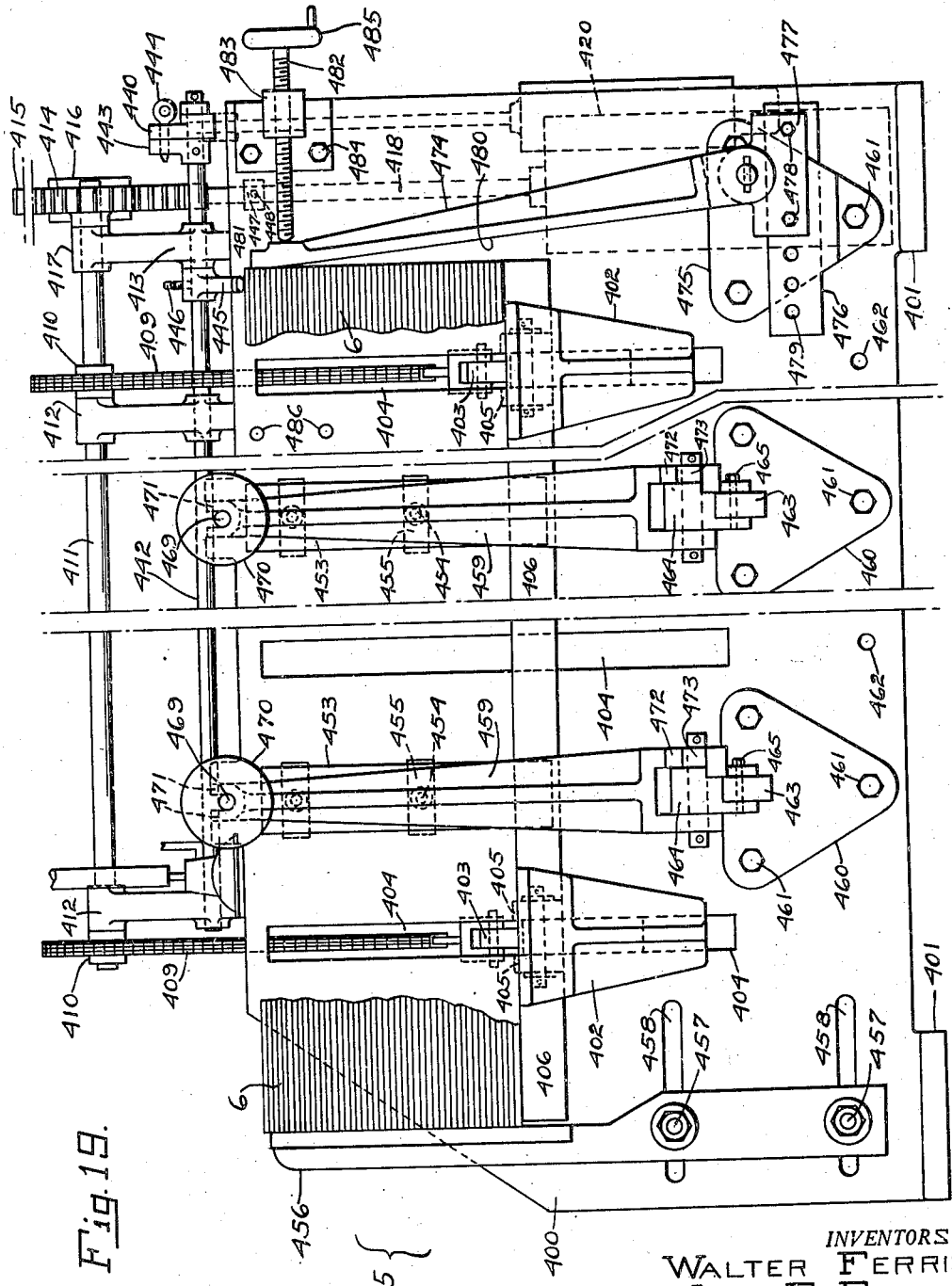

Nov. 5, 1935.  W. FERRIS ET AL  2,019,848
SELF FEEDING PRESS
Filed Oct. 24, 1931   12 Sheets-Sheet 12
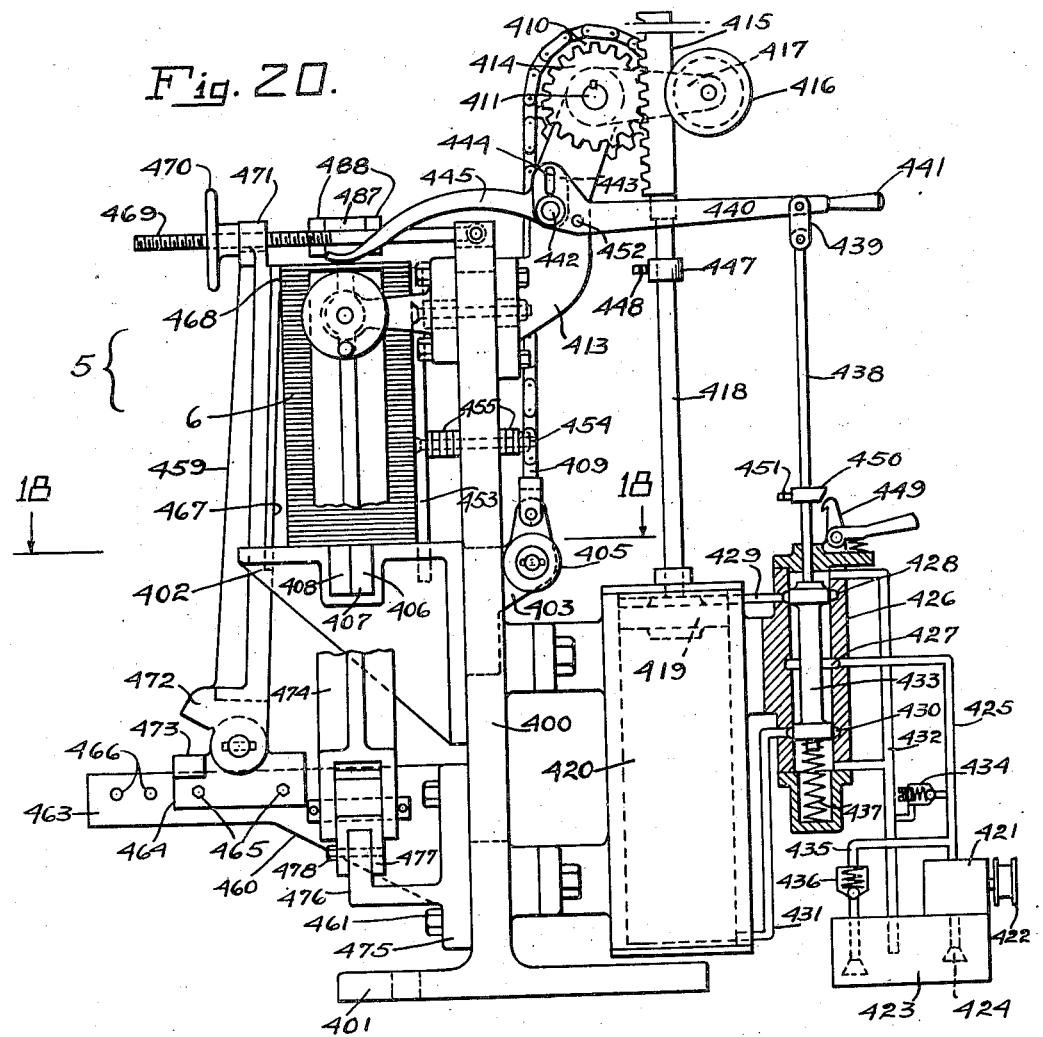
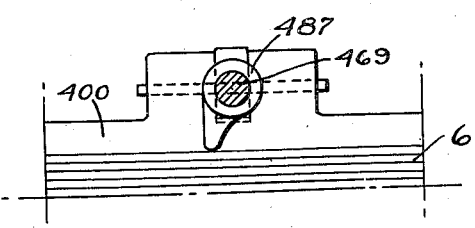
INVENTORS
WALTER FERRIS.
JOHN P. FERRIS.
GEORGE L. HEIDEN.
BY *Wesley Merrill*
ATTORNEY.

Patented Nov. 5, 1935

2,019,848

UNITED STATES PATENT OFFICE 2,019,848

SELF-FEEDING PRESS

Walter Ferris, Milwaukee, John P. Ferris, Whitefish Bay, and George L. Heiden, Milwaukee, Wis., assignors to The Oilgear Company, Milwaukee, Wis., a corporation of Wisconsin Application October 24, 1931, Serial No. 570,822

45 Claims. (Cl. 164—56)

This invention relates to hydraulic presses.

The press to which the invention applies in particular has a ram for reciprocating a movable die toward and from a stationary die and feeding mechanism for engaging the work and feeding it through the press intermittently, such as the press disclosed in Patent No. 2,016,710.

The work is engaged by the feeding mechanism, then fed into the press in position to be operated upon by the dies, then released by the feeding mechanism, then the movable die is advanced into engagement with the work, then the feeding mechanism is retracted, then the work is reengaged by the feeding mechanism, and then the movable die is retracted, thus completing a cycle of operation.

The press may be adjusted to complete a single cycle of operation and then come to rest but, as it is intended primarily for operating upon sheet metal strips, it is ordinarily operated continuously until stopped by the operator who must place another strip in position to be engaged by the feeding mechanism when the preceding strip has been fed into the press.

An object of the invention is to provide a press which is fully automatic in operation.

Another object is to provide means for automatically placing the work in position to be engaged by the feeding mechanism.

Another object is to provide a press of this character with a magazine from which the work is fed automatically into the press.

Another object is to decelerate the press automatically during the placing of the work in position to be engaged by the feeding mechanism.

Another object is to prevent the movable die from engaging the work during any cycle of operation during which the work only partially overlaps the dies.

Another object is to provide mechanism which will enable the press to operate automatically upon strips of various lengths.

Another object is to provide a press which will operate upon strips of various widths.

Another object is to maintain the top of the work in the magazine substantially at a predetermined level.

A press constructed according to the invention may have its magazine supplied with a stack or pile of strip material and its mechanism adjusted to perform a given number of operations upon each strip, and then the press will operate without further attention until the work in the magazine is exhausted.

Other objects and advantages will appear hereinafter.

According to the invention in a general aspect, the mechanism will lift the uppermost strip from a stack of work and place it in position to be engaged by the feeding mechanism.

According to another aspect of the invention, the stack is raised as the strips are removed from its top.

According to another aspect of the invention, timing mechanism is employed for determining the number of operations which the press will perform upon a strip of material before another strip is placed in position to be engaged by the feeding mechanism.

According to another aspect of the invention, the timing or control mechanism causes the press to be decelerated at the same time that it starts the operation of the transfer mechanism.

According to another aspect of the invention, the feeding mechanism has grippers which engage the work and these grippers are adjustable toward and from the path of the work to accommodate strips of different widths.

The mechanisms and the motors which produce the several movements are so interrelated and connected that the movements must follow each other in a predetermined sequence.

A press embodying the invention is illustrated in the accompanying drawings in which the views are as follows:

Fig. 2 is a side view of the press as indicated by the line 2—2 of Fig. 1, the magazine and the dies being omitted.

Fig. 3 is a central transverse section on the line 3—3 of Fig. 1, the dies being shown in dotted lines.

Fig. 4 is a vertical section through dies which may be employed, these dies being shown in dotted lines in Fig. 3.

Fig. 5 is a detail view, partly in section, of a detent for holding the work against retraction while being fed through the press, the view being taken on the line 5—5 of Fig. 3.

Fig. 6 is a section on the line 6—6 of Fig. 5.

Fig. 7 is a rear elevation taken on the line 7—7 of Fig. 2.

Fig. 8 is a sectional plan view taken on the line 8—8 of Fig. 1.

Fig. 9 is a sectional plan view taken on the line 9—9 of Fig. 1.

Fig. 10 is a detail view of a part of the mechanism which grips the work and carries it through the press, the view being partly in section and taken on the line 10—10 of Fig. 9.

Fig. 11 is a longitudinal section through the hydraulic motors which reciprocate the feed bar shown in Fig. 9, the view being taken on the line 11—11 of Fig. 2.

Fig. 12 is a section on the line 12—12 of Fig. 11.

Figs. 13, 14 and 15 are detail views of the control mechanism and show the parts thereof in various operative positions.

Fig. 16 is a diagram of the hydraulic circuit and shows schematically the relation of the various parts to each other and also shows certain of the parts in section.

Fig. 17 is a plan view, partly in section, taken in the plane of the line 17—17 of Fig. 1 and showing the relation between the press and its magazine, the angle at which the magazine is normally arranged relatively to the press being exaggerated.

Fig. 18 is a sectional plan view of the magazine taken on the line 18—18 of Fig. 20.

Fig. 19 is a front view of the magazine, the central part thereof being broken away.

Fig. 20 is an end view, partly in section, of the magazine.

Fig. 21 is a detail of a detent for holding the work against retraction as it is fed from the magazine, the view taken substantially on the line 21—21 of Fig. 17.

Figure 1:
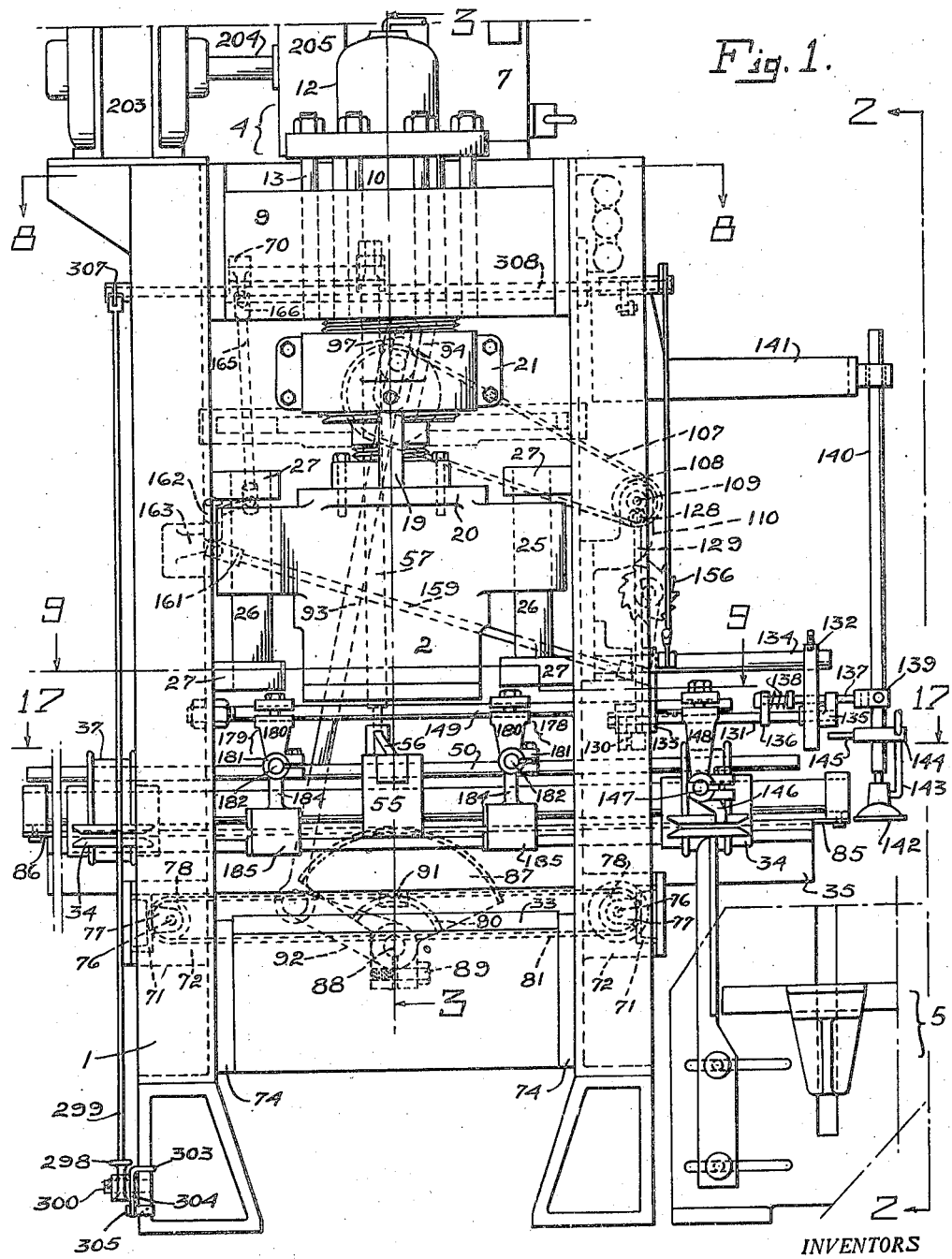
Fig. 1 is a front view, the greater part of the magazine and the upper parts of the pump and motor which operate the press being broken away and the dies omitted.

The invention is shown embodied in a vertical press in which the ram is reciprocated toward and from a stationary bolster arranged vertically beneath it but, with slight changes, the press may be arranged horizontally or inverted, and the terms denoting direction used herein are descriptive of the press shown and are not employed to limit the scope of the invention.

The press comprises, in general, a frame 1, a platen 2 guided in the frame 1 and reciprocated therein by a ram 3 which has its cylinder 4 rigidly secured to the frame 1 at the upper end thereof, a magazine 5 for holding a stack of sheet metal strips 6 or other work to be operated upon by the press, mechanism for transferring the work from the magazine to the press, mechanism for feeding the work through the press, and mechanism for controlling the operation of the press.

Liquid for operating the press is supplied from a pump 7 which is shown arranged upon the top of the frame 1 and is ordinarily adjustable to vary the volume of liquid delivered to thereby vary the speed of the press but, when once adjusted, the volume of liquid delivered remains constant irrespective of the pressure developed. A pump which may be employed is disclosed in Patent No. 1,558,002, issued October 20, 1925 to Walter Ferris, but the hand-operated stroke-changing mechanism of the patent is replaced by a piston and a cylinder for changing the stroke of the pump between two preset adjustments, as shown diagrammatically in Fig. 16.

Liquid for operating the stroke-changing mechanism of the pump 7 and for other auxiliary purposes is supplied by a gear pump 8 which is ordinarily incorporated in the pump 7, as shown in Patent No. 1,558,002.

The frame 1, which is ordinarily composed of structural plates and shapes suitably formed and welded together, has a cross-girder 9 extending transversely of its upper end in which the ram cylinder 4 is rigidly secured.

The ram cylinder 4 has a lower section 10, which extends through the bottom of the cross-girder 9 and has a shoulder 11 resting thereon, and an upper section 12 which closes the top of the lower section 10 and is rigidly secured to the bottom plate of the cross-girder 9 by elongated bolts 13.

The lower section 10 has a bore 14 and a pressure chamber 15, and the upper section 12 has a bore 16 and a pressure chamber 17, all of which are concentric.

The ram 3 has its upper part closely fitted in the bore 16 and guided thereby, a piston 18 arranged intermediate its ends and closely fitted in the pressure chamber 15, and its lower part extended through the bore 14 and closely fitted in suitable packing which is provided therein in the usual manner.

The ram 3 is retracted and supported by liquid which is delivered to the lower end of the chamber 15 and acts upon the under side of the piston 18, and it is advanced by liquid which is delivered simultaneously to the chamber 17 and to the upper end of the chamber 15 and acts upon the upper end of the ram 3 and the upper side of the piston 18. A ram area equal to the entire cross-sectional area of the piston 18 is thus subjected to hydraulic pressure during the working stroke of the press.

The press is capable of operating at high speed and is ordinarily so adjusted that its stroke is but little greater than the thickness of the material being operated upon. For instance, if the press is operating upon thin sheet metal, it is adjusted to make a stroke of approximately one-eighth inch.

The downward stroke of the ram is limited by the lower die or die block, which is adjusted in alinement with the feeding mechanism, and the upward stroke of the ram is limited by a stop pin 19 which engages the upper flange 20 of the platen 2 and is carried by a split collar 21 threaded upon the lower end of the lower section 10 of the ram cylinder 4 and clamped in adjusted positions thereon.

The upper limit of the ram stroke is adjusted by rotating the collar 21 to raise or lower the pin 19 and, when it is desired to fully retract the ram, the collar 21 is rotated until the pin 19 is in alinement with a notch 22 formed in the flange 20.

The platen 2 has a recess 23 extending downwardly from its top to receive the lower end of the ram 3 which bears upon the bottom thereof and is so closely fitted therein that the platen and the ram form substantially a unitary structure. The ram 3 may also have a collar 24 threaded thereon and bolted to the top of the platen 2 to prevent the lower end of the ram 3 and the bottom of the recess 23 from separating when the press is operating.

The platen 2 has two bearings 25 arranged upon opposite sides thereof and fitted for reciprocation upon vertical guide bars 26 each of which has its ends secured in lugs 27 fixed to the frame 1 and forming parts thereof.

The guide bars 26 and the wall of the bore 16 thus provide widely separated guides for the ram and platen unit which is accurately held thereby in alinement with the axis of the cylinder 4 and prevented from exerting lateral pressure upon the wall of the chamber 15 or the packing in the bore 14.

The press is provided with suitable dies and die blocks, such as those shown in Fig. 4, which have been shown in dotted lines in Fig. 3 and omitted entirely from Figs. 1 and 2 in order to expose other parts of the press.

As shown in Fig. 4, the upper or movable die 28 is carried by a die block 29 which is secured to the bottom of the platen 2, and the lower or stationary die 30 is ordinarily provided with a stripper 31 and secured to a bolster 32 carried by a bed plate 33 which forms a part of the frame 1.

When dies of this type are employed, the work is fed between the lower die 30 and the stripper 31 and then the upper die 28 is advanced until the die block 29 engages the stripper 31 and stalls the ram, thereby causing reversal of the ram and retraction of the die 28 as will be described hereinafter.

The work is fed into and through the press by one or more grippers 34, two of which are shown arranged on opposite sides of the lower die 30 and adapted to reciprocate toward and from the die 30 upon a horizontal gripper support 35 which extends transversely of the press and is carried by the frame 1 in an adjusted stationary position.

The work is fed into the press by one gripper until it is engaged by the second gripper, then it is fed through the press by both grippers until it passes beyond the reach of the first gripper, and then it is fed out of the press by the second gripper.

The gripper support 35 has two V-faced ways 36 which extend along its upper edges transversely of the press and upon which the grippers 34 slide.

As best shown in Fig. 10, each gripper 34 has a frame 37 which is mounted upon the ways 36 and provided with bearings 38 to reduce the friction therebetween. The bearings 38 are shown in Fig. 10 as being liners but, in practice, roller bearings are employed.

The gripper frame 37 has a stationary jaw 39 formed upon its front side and a movable jaw 40 pivoted thereto, and the jaws 39 and 40 are provided, respectively, with contacts 41 and 42 which are secured thereto by means of bolts 43. The contacts are spaced from the jaws by fillers 44 which may be varied in number and thickness to adjust the jaws to the height of the lower die 30 and to the thickness of the work.

The gripper frame 37 has two spaced ribs or side walls 45 to which the lower end of the movable jaw 40 is pivoted by means of a pin 46 and between which it is held against lateral movement relatively to the frame 37.

The movable jaw 40 has a bifurcated upper end in which a thrust block 47 is arranged and pivoted thereto by means of a pin 48. The movable jaw 40 is rocked upon the pin 46 by a bifurcated lever 49 which is splined upon an elongated shaft 50 and fitted between the ribs 45 as to be moved therewith along the shaft 50 as the gripper 34 reciprocates, and the bifurcated front end of the lever 49 has a thrust block 51 arranged therein and pivoted thereto by a pin 52.

The thrust blocks 47 and 51 are urged apart by a helical compression spring 53 arranged between the same, and their relative movements are limited by two bolts 54 which are secured to the thrust block 51 and extend loosely through the thrust block 47, suitable nuts being provided on the outer ends of the bolts 54 to engage the front face of the thrust block 47.

The spring 53 holds the gripper 34 closed after it has been closed by a clamping motor and thereby relieves the clamping motor from all load as will be described presently. As the gripper is normally closed, it is shown in Fig. 10 as being closed upon a piece of work 6 which is indicated in dotted lines.

The shaft 50 is journaled between its center and each end in the ribs 45 of the grippers 34 and at its center in a bifurcated bearing 55 which is shown arranged upon the center line of the press and carried by the ways 36 of the gripper support 35 in a stationary position, as shown in Figs. 3 and 9.

The shaft 50 is rotated through a predetermined angular distance and held against axial movement by a lever 56 which is rigidly secured thereto at the center thereof and fitted between the two side walls of the bearing 55.

The free end of the lever 56 is connected by a connecting rod 57 to the outer end of a lever 58 which is secured upon a shaft 59 journaled in the side walls of a motor support 60 carried by the frame 1 near the upper end thereof, as best shown in Figs. 3 and 8.

The connecting rod 57 is ordinarily made adjustable as to length and it may comprise a bar or tube having a clevis attached to one end thereof by right hand threads and a clevis attached to the other end thereof by left hand threads, as shown in Fig. 3.

The shaft 59 has two levers 61 secured thereon at an angle to the lever 58 and connected at their outer ends by links 62 to an axle 63 which has a roller 64 arranged upon each of its ends and guided in a track 65 carried by the motor support 60.

The levers 61 are arranged between the side walls of the motor support 60 and each abuts the inside of a side wall to hold the shaft 59 against axial movement.

The axle 63 is moved forwardly and rearwardly by a hydraulic clamping motor which has its cylinder 66 secured to the motor support 60 and the rod 67 of its piston 68 connected to the axle 63 by a yoke 69 which is arranged between the links 62.

The shaft 59 also has a lever 70 secured thereon to operate certain control mechanism which will be described hereinafter.

When working liquid is delivered to the rear or head end of the cylinder 66, the piston 68 advances and moves the axle 63 forwardly and the rollers 64 ride along the tracks 65 and hold the piston rod 67 in alinement and prevent any lateral strains from being transmitted thereto from the levers 61.

The forward movement of the axle 63 is transmitted through the links 62 to the upper ends of the levers 61 which rotate the shaft 59 through a predetermined angular distance and thereby depress the front ends of the levers 58 and 70.

The downward movement of the lever 58 is transmitted through the connecting rod 57 to the lever 56 which rotates the shaft 50 and causes it to swing the lever 49 upwardly and rearwardly, thereby drawing the upper end of the jaw 43 rearwardly and opening the gripper.

When liquid is delivered to the front or rod end of the cylinder 66, the shaft 50 is rotated in the opposite direction and the upper end of the jaw 40 is moved forwardly until the contacts 41 and 42 engage the work 6 and exert pressure thereon and then the bolts 54 slide forwardly through the thrust block 47 and the spring 53 is compressed until the pin 52 reaches dead center, that is, in alinement with the pin 48 and the shaft 50 and then further rotation of the shaft 50 allows the spring 53 to expand until further movement of the lever 49 is prevented by a positive stop such as the piston 68 engaging the end of the cylinder 66.

The spring 53 then holds the contacts 41 and 42 firmly in engagement with the work 6 and relieves the clamping motor of its load, thereby allowing the working liquid to be diverted to other uses.

In order that strips of different widths may be fed through the press and a wide variety of dies employed, the grippers 34 may be moved forwardly and rearwardly to vary the distance between their paths and the lower die 30.

This is accomplished by fixing the gripper support 35 upon two slides 71 each of which is slidably supported in two guides 72 and 73 carried by the frame 1 upon opposite sides thereof, as best shown in Figs. 1, 2 and 9.

The guides 72 have their inner ends welded to the lower web or side plate 74 which connects the front and rear corner posts of the frame 1, the guides 73 have their inner ends welded to the rear corner posts, and the outer ends of all four guides are notched or recessed to receive the slides 71 which are held therein by suitable retaining bars bolted to the outer ends of the guides.

The grippers 34 may be moved forwardly and rearwardly by means of two adjusting screws 75 and 76 each of which is journaled in a rear corner post and threaded through a lug 77 secured to the inner face of the corresponding slide 71.

Each of the screws 75 and 76 is held against forward movement by a sprocket wheel 78 which is secured to the outer end thereof and has its hub in contact with the rear face of the rear corner post, and each of the screws is held against rearward movement by a collar 79 which is secured thereon in contact with the front face of the rear corner post.

The screw 75 has a hand wheel 80 secured to its outer end for rotating it, and the sprockets 78 are connected to each other by a chain 81 which causes the screws 75 and 76 to be rotated in unison and thereby move both ends of the gripper support 35 in unison and through the same distance.

The grippers 34 are held in spaced relation to each other by a tubular bar 82 which extends loosely through the bearing 55 and has the grippers 34 secured thereto upon opposite sides of its center by means of clamps 83 which are shown as being formed integral with gripper frame 37 and one of each arranged alongside each rib 45 upon the outside thereof, as best shown in Figs. 9 and 10.

The clamps 83 are split along one side thereof in the customary manner and the split side of each is provided with a bolt 84 which is tightened to secure the gripper 34 to the feed bar 82.

The grippers 34 are arranged in the desired position upon the feed bar 82 and the bolts 84 are tightened to hold them in adjusted positions, and then the feed bar is reciprocated to enable the grippers to feed the work through the press.

The feed bar 82 is reciprocated by two flexible bands 85 and 86 which have their outer ends secured to opposite ends of the feed bar and their inner ends secured to a quadrant 87 carried by a shaft 88 journaled in the frame 1.

The quadrant 87 is splined upon the shaft 88 and has its hub split and provided with a bolt 89 for clamping it thereon in adjusted positions.

As best shown in Fig. 3, the quadrant 87 extends upwardly between the side rails 36 of the gripper support 35 and is provided upon its front and rear faces with narrow faced arcuate ribs 90, and the support 35 has a lug 91 fixed to the bottom of each of its side rails to engage a rib 90 when the support 35 is moved forwardly or rearwardly.

When the grippers 34 are to be adjusted toward or from the dies, the bolt 89 is loosened and the hand wheel 80 rotated to move the gripper supports 35 forwardly or rearwardly, and a lug 91 will engage a rib 90 and move the quadrant 87 along the shaft 88. After the grippers 34 and the quadrant 87 are adjusted, the bolt 89 is tightened.

The feed bar 82 and the grippers 34 are reciprocated through a predetermined horizontal distance by rotating the shaft 88 through a predetermined angular distance to thereby rock the quadrant 87 through the same angular distance.

The shaft 88 is rotated by a lever 92 which is secured to the shaft 88 near the rear end thereof and has the lower end of a connecting rod 93 pivoted thereto. The upper end of the connecting rod 93 is arranged between the two sides of a bifurcated crank arm 94 and pivoted thereto by a crankpin 95 which is secured by its nut 96 in adjusted position within elongated slots 97 formed in the sides of the crank arm 94 in alinement with each other.

Adjusting the crankpin 95 longitudinally of the slots 97 varies the angular distance through which the shaft 88 is rotated and thereby varies the stroke of the feed bar 82 and the distance which a piece of work is advanced during each cycle of operation.

The crank arm 94 is fixed upon the front end of a shaft 98 which is provided intermediate its ends with a pinion 99 and journaled in a bearing 100 carried by the frame 1.

The shaft 98 is rotated in opposite directions by a rack 101 which meshes with the pinion 99 and is fitted in the bearing 100 to slide therein.

The rack 101 is moved in one direction by a hydraulic feed motor 102 and is moved in the opposite direction by a hydraulic feed motor 103 (Fig. 11). The motor 102 is secured to one end of the bearing 100 and has its plunger 104 in engagement with one end of the rack 101, and the motor 103 is secured to the other end of the bearing 100 and has its plunger 105 in engagement with the other end of the rack 101.

When driving liquid is delivered to the motor 102, the plunger 104 moves the rack 101 axially and causes it to rotate the pinion 99 and thereby rotate the crank arm 94 through a predetermined angular distance which is ordinarily approximately 180°, the pin 95 moving from the highest point of its path of travel to the lowest point thereof.

This movement of the crank arm 94 depresses the connecting rod 93 which rocks the quadrant 87 to the left in respect to Fig. 1 and causes the flexible band 85 to advance the feed bar 82 and feed through the press any work with which the grippers 34 are engaged.

When driving liquid is delivered to the motor 103, its plunger 105 moves the rack 101 in the opposite direction and causes it to rotate the pinion 99 and the crank arm 94 in the opposite direction, thereby causing the quadrant 87 to be rocked to its initial position and the flexible band 86 to retract the feed bar 82 to its initial position.

During a cycle of operation, the feed bar 82 advances a predetermined distance and feeds a strip of material into the press a distance corresponding to the adjustment of the pin 95, then the gripper 34 opens and releases the strip, then the ram 3 descends, then the feed bar is retracted, then the gripper engages the strip to advance it into the press during the next cycle of operation, and then the ram rises. The press is ordinarily operated continuously and the cycles follow each other in rapid succession.

When the trailing end of the strip passes beyond the forward end of the magazine, transfer mechanism is operated to move another strip from the magazine into position to be engaged by the gripper.

The transfer mechanism is driven by the motors 102 and 103 through a sprocket wheel 106 which is secured to the rear end of the shaft 98 and connected by a chain 107 to a sprocket wheel 108 fixed to the rear end of a clutch shaft 109, as best shown in Figs. 7 and 8. The ratio between the sprocket wheels 106 and 108 is such that the shaft 109 makes at least a full revolution during each reciprocation of the rack 101.

The clutch shaft 109 is journaled near the rear end thereof in a bearing 110 carried by the frame 1 and has its front end journaled in the rear end of a crankshaft 111 which is journaled in two bearings 112 carried by the frame 1.

The crankshaft 111 is yieldingly held against rotation by a spring detent 113 and is rotated a complete revolution during certain cycles of operation by the clutch shaft 109 through a jaw clutch which has its fixed jaw 114 secured to the rear end of the shaft 111 and its movable jaw 115 splined upon the shaft 109 near the front end thereof.

The jaw 115 is adapted to be moved into and out of engagement with the clutch jaw 114 by a lever 116 (Fig. 2) which is pivoted intermediate its ends upon the frame 1 and has a forked upper arm 117 connected to the clutch jaw 115.

The lever 116 is urged to its neutral position by a tension spring 118, which is connected to the arm 117 and the frame 1, and it is adapted to be yieldingly retained in its operative position by a spring detent 119 which is carried by the frame 1 to engage the front arm of the lever 116.

The lever 116 normally has its front end in position to depress the stem 120 of a pump control valve 121 and its rear end in position to be elevated by a control chain 122. When the rear end of the lever 116 is raised, the arm 117 moves the jaw 115 into engagement with the jaw 114, so that the crankshaft 111 will be rotated in unison with the clutch shaft 109, and the front arm of the lever 116 enters the detent 119 and depresses the valve stem 120 against the resistance of a helical compression spring 123 which is arranged between the casing of the valve 121 and a collar 124 secured to the stem 120.

Depressing the valve stem 120 causes the stroke of the pump 7 to be shortened and the press to be decelerated.

The valve stem 120 may be depressed manually by raising the front end of a hand lever 125 which is pivoted intermediate its ends upon the frame 1 and has its front end provided with a handle 126 and its rear end forked and in engagement with the collar 124. The lever 125 is ordinarily held in inoperative position by a spring clip or detent 127.

The crankshaft 111 has a crankpin 128 secured to its front end and connected by a rod 129 to a lever 130 which is fixed to a shaft 131 to rotate the same. The shaft 131 is journaled in two arms 132 and 133 which are rigidly secured to a horizontal bar 134 carried by the frame 1 in a stationary position and held against rotation thereby. (Figs. 1, 2 and 9.)

The shaft 131 has a lever 135 secured to its outer end at an angle to the lever 130 and in radial alinement with a lever 136 which is secured to the shaft 131 intermediate its ends.

The levers 135 and 136 have an elongated pin 137 journaled in their outer ends and urged outward or to the right in respect to Fig. 1 by a helical compression spring 138 which is arranged between the lever 136 and a suitable collar fixed upon the pin 137, the outward movement of the pin 137 being limited by a suitable head or collar fixed upon its inner or left end.

The outer end of the pin 137 has one part of a universal joint 139 secured thereto the other part of which is secured to a vertical lift rod 140 having its upper end loosely guided by a guide bracket 141 carried by the frame 1.

The lower end of the lift rod 140 carries a suction cup 142 which is made of flexible material, such as rubber, and connected to a vacuum pump (not shown) by a flexible tube 143 having a valve 144 connected therein.

The valve 144 normally maintains communication between the flexible cup 142 and the vacuum pump which exhausts air from the cup 142 continuously until the stem 145 of the valve 144 is forced inwardly to open the cup to the atmosphere.

As the clutch shaft 109 is connected by the chain 107 and the sprocket wheels 106 and 108 to the shaft 98, it is rotated first in one direction and then in the other in unison with the reciprocation of the feed bar 82 but, as the clutch jaw 115 is held out of engagement with the clutch jaw 114 by the spring 118, the crankshaft 111 remains stationary until the control chain 122 operates the lever 116 to engage the jaw 115 with the jaw 114.

When the feed bar 82 is retracted toward the magazine 5, the clutch shaft 109 is rotated slightly more than a full revolution in a clockwise direction as viewed from the front of the press and, if the lever 116 has been operated, the clutch jaw 115 will engage the clutch jaw 114 and rotate the crankshaft 111.

When the feed bar 82 is advanced to feed the work into the press, the clutch shaft 109 is rotated in a counterclockwise direction and the inclined faces on the teeth of the clutch jaws assist the spring 118 in moving the jaw 115 out of engagement with the jaw 114 and the lever 116 out of the detent 119, thereby allowing the spring 123 to raise the stem 120 of the valve 121 to accelerate the press.

The control chain 122 is adjusted to operate the lever 116 when the end of a strip leaves the discharge trailing end of the magazine 5 so that the clutch jaw 115 is in engagement with the jaw 114 and the shaft 111 is rotated and the speed of the press is decelerated during the retraction stroke of the feed bar 82.

Rotation of the shaft 111 causes the connecting rod 129 to raise and lower the outer end of the lever 130 and rock the shaft 131, thereby swinging the outer ends of the levers 135 and 136 and the pin 137 forwardly and downwardly through a predetermined angular distance and then returning them to their initial positions.

The pin 137 swings the lower end of the lift rod 140 forwardly and downwardly until the suction cup 142 is pressed against the uppermost strip in the magazine, the vacuum pump exhausts air from the cup 142 and causes it to cling to the strip, then the pin 137 swings the lower end of the rod 140 upwardly and rearwardly and the cup 142 carries the strip with it.

The cup 142 reaches its initial position at substantially the same time that the feed bar 82 reaches the limit of its retraction stroke so that the edge of the strip is passed into the jaws of the gripper, the free end of the strip being limited in its upward movement and guided into the gripper by a stop 146.

The stop 146 is secured to a bar 147 which is clamped in adjusted position to a depending arm 148 attached to a cross bar 149 carried by the frame 1.

The gripper then closes upon the strip and, when the feed bar 82 advances, it carries the strip toward the dies and swings the lower end of the lift rod inward with it, the pin 137 sliding through the levers 135 and 136 until the valve stem 145 abuts the arm 132 and is depressed thereby to open the cup 142 to the atmosphere.

The cup 142 then releases the strip and the spring 138 swings the lower end of the rod 140 outward to its initial position.

The length of each strip is somewhat greater than required to make a given number of pieces therefrom due to the fact that such strips are not sheared accurately as to length and also to the fact that it is ordinarily impractical to make the edge of a blanking die coincide with the edge or end of a piece of work being operated upon.

Therefore, when each strip has been advanced from the magazine the number of steps or distances corresponding to the number of pieces to be made therefrom, its rear end overlaps the discharge end of the magazine by a distance equal to the length of the strip in excess of that required to form the given number of pieces, and the strip should then be advanced another step before the transfer mechanism is operated in order to move its rear end beyond the end of the uppermost strip in the magazine.

The operation of the transfer mechanism is controlled by the control chain 122 which is advanced during each cycle of operation a distance equal to the length of one of its links by a driving sprocket 150 fixed upon a shaft 151 which is journaled in a suitable bearing carried by the frame 1.

The control chain 122 extends around the driving sprocket 150, an idler sprocket 152 and two or more idler sprockets 153. The sprocket 152 may have its shaft carried by the frame 1 in a stationary position, and the sprockets 153 may have their shafts carried by the frame 1 in adjusted positions to accommodate different lengths of the control chain 122, as by being secured in slots 154 formed in a back plate of the frame 1 as shown in Fig. 7.

Operation of the transfer mechanism is initiated by a cam 155 which is so adjusted upon the control chain 122 that it will raise the rear end of the lever 116 and cause the transfer mechanism to operate during the next cycle of operation after the rear end of a strip has passed beyond the discharge end of the magazine.

The control chain 122 may be provided with one cam 155 and have one more link than the number of operations to be performed upon the strip or it may have any multiple of that number of links and be provided with a corresponding number of cams 155 spaced equal distances apart.

For example, if twenty-nine operations are to be performed upon each strip, the control chain 122 may have thirty links and a cam 155 attached to one link, or any multiple of thirty links and a cam 155 attached to every thirtieth link. In Fig. 7, the chain 122 is shown as having sixty links and a cam 155 attached to every thirtieth link. The feed mechanism thus makes one more reciprocation per strip than there are operations to be performed upon each strip.

During a cycle of operation in which the transfer mechanism is to be operated, the control chain 122 moves a cam 155 under and beyond the rear end of the lever 116, thereby moving the lever 116 to its operative position in which it is held by the detent 119 and then leaves its rear end free so that it may be returned to its neutral position when the feed bar 82 next advances, as previously described.

The chain 122 is of a type which may have links readily added thereto or removed therefrom, and the sprocket wheels 153 may be placed in various positions or more than two thereof employed to accommodate various lengths of chain, as shown in Fig. 7.

The driving sprocket 150 is rotated intermittently by pawl and ratchet mechanism which has a ratchet wheel 156 fixed upon the shaft 151 and engaged by a pawl 157 pivoted upon an arm 158 and urged into engagement with the teeth of the ratchet wheel by a spring (not shown).

The arm 158 is pivoted at its upper end upon the shaft 151 and connected at its lower end to one end of a link 159 by a ball and socket joint 160. The link 159 has its other end connected by a ball and socket joint 161 to one arm of a bell crank lever 162 which is pivoted upon a trunnion 163 carried by the frame 1.

The other arm of the bell crank lever 162 is connected by a ball and socket joint 164 to one end of a link 165 which has its other end connected by a ball and socket joint 166 to the lever 70 on the shaft 59. (Fig. 8.)

When the piston 68 of the clamping motor advances and rotates the shaft 59 to open the grippers 34, the lever 70 is swung downwardly and rearwardly and this movement is transmitted through the link 165, the bell crank lever 162 and the link 159 to the lower end of the arm 158 which is swung toward the centerline of the press and causes the pawl 157 to engage a tooth of the ratchet wheel 156 and rotate it and the driving sprocket 150 through an angular distance equal to the length of one link of the control chain 122.

When the piston 168 is retracted, the arm 158 is swung in the opposite direction to move the pawl 157 into position to engage the next tooth on the ratchet wheel 156. The control chain is thus advanced one link during each cycle of operation of the press.

The control chain may be adjusted to permit the press to operate upon strips of various lengths but, when once adjusted, strips of approximately the same length should be supplied to the press until the control chain is again adjusted.

Due to the act that the feed mechanism makes one more reciprocation per strip than there are operations to be performed upon each strip and to the fact that a small amount of excess stock remains upon each end of each strip after all of the operations thereon have been completed, as previously explained, the trailing end of one strip and the leading end of the following strip will partly overlap the dies during certain cycles of operation so that the dies might be damaged if the ram descended during those particular cycles.

In order to avoid possible damage to the dies from this cause and to permit a part of a strip to be left blank for any particular purpose, the control chain may be employed to cause the ram to miss a stroke during any given cycle of operation, for instance during the cycle in which the end of a strip partially overlaps the dies so that only a part of the die area would operate upon the strip if the ram descended.

For this purpose, the operating chain 122 is provided with one or more pins 167 each of which is arranged in a position in the chain corresponding to the cycle in which the ram stroke is to be omitted.

In the example given above and as shown in Fig. 7, two of the pins which connect adjacent links of the chain to each other are replaced by two long pins 167 which extend beyond the front side of the chain. The pins 167 are equally spaced from each other and so located in the chain that the ram is caused to miss a stroke when the end of a strip is between the dies.

The ram is caused to miss a stroke by operating a valve 168 (Figs. 2, 7 and 16) which is carried by the frame 1 and has its plunger 169 normally held by a spring detent 170 in position to allow liquid to flow to and from the ram cylinder 4.

The valve plunger 169 has its stem 171 connected by a pair of links 172 to one end of a lever 173 which is secured to the front end of a shaft 174 journaled in a suitable bearing carried by the frame 1.

The shaft 174 has a cam lever 175 secured to its rear end parallel to the path of the chain 122 and slightly spaced therefrom. The lever 175 has two curved fingers or cam arms 176 and 177 which are arranged upon opposite sides of the path of the pins 167 and have their lower ends curved inwardly or toward each other so that the inner face of either one cam arm or the other is always in the path of the pins 167.

During the cycle of operation in which the chain 122 is indexed ahead to move a pin 167 from the position shown in Fig. 16 downwardly one space, the pin 167 acts upon the inner face of the cam arm 176 and swings the lever 175, thereby rocking the shaft 174 and raising the outer end of the lever 173 which raises the valve plunger 169 to close communication between the ram cylinder 4 and the pump 7. Consequently, the ram 3 will not be advanced during that cycle of operation.

During the next cycle of operation, the pin 167 engages the cam face on the inside of the cam arm 177 and swings the lever 175 to its initial position, thereby returning the valve plunger 169 to its initial position so that the ram may be advanced during that cycle of operation.

The ram will continue to reciprocate during each cycle of operation until the next pin 167 operates the lever 175 to cause it to miss another stroke.

If the strip to be operated upon is advanced so short a distance that it is not engaged by the dies during the same cycle of operation in which it is first seized by the gripper and if the strip is relatively short, there is some danger that it will be retracted slightly by the gripper during the retraction stroke thereof and thereby prevent the press from forming a predetermined number of complete blanks or other articles from each strip.

In order to eliminate this danger, the press is provided with two detents 178 and 179 which are substantially alike and are carried by the cross bar 149 upon opposite sides of the lower die 30 in such a manner that they may be swung out of operative position or removed when desired.

The detent 178 is adapted to prevent the strip 6 from being retracted before it is engaged by the dies and the detent 179 is adapted to prevent the strip from being retracted after it has passed beyond the reach of the dies.

As shown in Figs. 3 and 5, each of the detents 178 and 179 has a vertical arm 180 which is clamped to the cross bar 149 and provided at its lower end with a clamp 181 to engage a horizontal bar 182 having a clamp 183 secured to its rear end.

The clamp 183 has secured therein the stem 184 of a block 185 which is provided with a recess 186 having converging upper and lower walls and with a horizontal slot or bifurcation 187 to allow a strip of work 6 to pass therethrough and through the recess 186, the strip being shown in dotted lines in Fig. 5.

The recess 186 contains two tapered jaws or wedges 189 which are urged toward the small end of the recess 186 by light compression springs 190 and held in contact with the upper and lower walls of the recess 186 by flanges 191 which are formed upon the sides of the jaws 189 and fitted in guideways 192 formed in the side walls of the recess 186.

When the strip 6 is advanced through the block 185, the jaws 189 are moved against the resistance of the springs 190 and allow the strip to advance freely but, if the strip tends to retract, the jaws 189 wedge between the inclined walls of the recess 186 and the strip and prevent it from retracting.

The clamps 181 and 183 allow the block 185 to be adjusted both vertically and horizontally to conform to the height of the lower die and to the width of the strip being operated upon.

As shown diagrammatically in Fig. 16, the pumps 7 and 8 are ordinarily arranged in a common casing the lower part of which constitutes a reservoir 193 for a supply of working liquid, such as oil.

The low pressure or gear pump 8 draws its liquid from the reservoir 193 through a suction pipe 194 and discharges it into a low pressure supply pipe 195, and the pressure in the pipe 195 is limited by a relief valve 196 which is connected to the outlet of the pump 8 and discharges into the reservoir 193. The relief valve 196 is adjusted to open at a low pressure, for instance 75 lbs. per square inch.

The high pressure or variable pump 7 supplies liquid to the hydraulic circuit through a high pressure supply pipe 197 and has liquid returned from the circuit to its intake through a return pipe 198, the pressure created by the pump 7 being limited by a relief valve 199 which is connected to the outlet thereof and discharges into the reservoir 193. The relief valve 199 is adjusted to open at a high pressure, for instance 1750 lbs. per square inch.

If the volume of liquid required by the pump 7 is greater than the volume of liquid being returned thereto, the pump draws additional liquid from the reservoir 193 through a suction pipe 200 having a check valve 201 connected therein and, if the volume of liquid returned from the circuit is greater than the volume required by the pump 7, the excess liquid is exhausted into the reservoir 193 through a relief valve 202 which is adjusted to open at a low pressure, for instance 15 lbs. per square inch.

The pump 7 is ordinarily driven at a constant speed by an electric motor 203, which is arranged upon the top of the frame 1 and connected to the pump 7 by a shaft 204 having a flywheel 205 attached thereto, and the volumetric delivery of the pump is varied by changing its stroke.

As set forth in Patent No. 1,558,002, the cylinders of the pump 7 rotate about a stationary axis and the pistons thereof rotate about a movable axis which is eccentric to the cylinder axis when the pump is delivering liquid. The pistons may be moved transversely of the cylinder axis to change the stroke of the pump by means of an arm or pendulum which is shown diagrammatically in Fig. 16 and designated by the reference numeral 206.

The arm 206 is connected by a rod 207 to a piston 208 which it fitted in a cylinder 209 and adapted to be moved by hydraulic pressure to shift the arm 206 between two preset adjustments and cause the pump to deliver either a predetermined maximum volume or a predetermined minimum volume of liquid.

The movement of the arm 206 toward full stroke position is limited by a stop 210 which is shown as a bolt threaded through the pump casing, and the movement of the arm 206 toward minimum stroke position is limited by a stop 211 which is shown as a head or collar secured to the outer end of the rod 207 to abut the pump casing.

The stop 210 may be adjusted to vary the maximum volumetric delivery of the pump within the capacity thereof and thereby vary the normal speed of the press, and the stop 211 may be adjusted to vary the minimum volumetric delivery of the pump and thereby vary the speed of the press during the time that the transfer mechanism is in operation or during adjustment of the press or dies.

Liquid for actuating the piston 208 is supplied by the gear pump 8 and its delivery is controlled by the pump control valve 121 which has a port 212 arranged intermediate its ends and connected to the low pressure supply pipe 195, a port 213 arranged above the port 212 and connected by a pipe 214 to the outer or head end of the cylinder 209, and a port 215 arranged below the port 212 and connected by a pipe 216 to the inner or rod end of the cylinder 209.

The valve 121 has a plunger 217 which is operated by its stem 120 to control the flow of liquid from the supply pipe 195 to the cylinder 209 and the discharge of liquid from the cylinder 209 to a drain pipe 218 which is connected to both ends of the valve 121 and discharges into the reservoir 193. When the valve plunger 217 is in its normal position as shown in Fig. 16, the head end of the cylinder 209 is open to gear pump pressure which holds the arm 206 against the stop 210, and the pump 7 delivers liquid at the predetermined maximum rate to operate the press at a predetermined high speed.

When a cam 155 on the control chain 122 raises the rear end of the lever 116 and thereby sets the transfer mechanism in motion and depresses the stem 120 of the control valve 121, the port 213 is closed to the port 212 and opened to the drain pipe 218, and the port 215 is closed to the drain pipe 218 and opened to the port 212.

Liquid from the gear pump 8 now flows through the pipe 195, the valve 121 and the pipe 216 to the rod end of the cylinder 209 and moves the piston 208 rearwardly, thereby swinging the arm 206 to its short stroke position to reduce the volumetric delivery of the pump 7 to the minimum and decelerate the press. As the piston 208 moves rearwardly, the liquid in the head end of the cylinder 209 is exhausted through the pipe 214 and the valve 121 into the drain pipe 218.

When the feed bar 82 advances after the transfer mechanism has completed its operation, the lever 116 which is returned to its initial position by the spring 118 and the plunger 217 is returned to its initial position by the spring 123 as previously described.

Liquid from the gear pump now flows through the pipe 195, the valve 121 and the pipe 214 to the head end of the cylinder 209 and advances the piston 208, thereby swinging the arm 206 to its long stroke position to accelerate the press. As the piston 208 advances, the liquid in the rod end of the cylinder 209 is exhausted through the pipe 216 and the valve 121 to the drain pipe 218.

The flow of liquid through the hydraulic circuit is controlled primarily by a reversing valve 219, a pilot valve 220 and a control valve 221 which ordinarily have their cylinders formed integral with each other and secured to the right side of the frame 1 near the top thereof, as shown in Figs. 2 and 8.

The reversing valve 219 controls the direction of ram and feed bar movement, the pilot valve 220 controls the reversing valve 219, and the control valve 221 controls the starting and stopping of the press.

The control valve 221 has a discharge port 222 which is connected by a pipe 223 to an admission port 224 in the reversing valve 219, a return port 225 which has the return pipe 198 connected thereto and is also connected by a pipe 226 to a return chamber 227 in one end of the reversing valve 219, and an admission port 228 which is arranged between the ports 222 and 225 and has the high pressure supply pipe 197 connected thereto.

The flow of liquid through the valve 221 is controlled by its plunger 229 which is in its neutral position as shown in Fig. 16 when the press is idle, at which time the port 222 is closed and the port 225 is open so that liquid delivered by the pump 7 is bypassed through the supply pipe 197, the valve 221 and the return pipe 198 to the intake of the pump.

The plunger 229 is urged to its neutral position by a small plunger 230 which is fitted in the bore of a cylinder 231 arranged upon the end of the valve casing and provided at its inner end with a chamber 232 having a drain pipe 233 connected thereto and discharging into the reservoir 193.

When the plunger 229 is moved to its operative position as shown in Fig. 14, its rear or inner end enters the chamber 232 and expels liquid or air therefrom into the drain pipe 233 and, when the plunger 229 is returned to its neutral position, liquid or air is drawn into the chamber 232 to prevent a partial vacuum from being formed therein.

The cylinder 231 has a port 234 arranged intermediate its ends and connected by a pipe 235 to the low pressure supply pipe 195 so that, when the plunger 229 is in its neutral position as shown in Fig. 16, it is held in that position by gear pump pressure acting upon the end of the plunger 230 but, when the plunger 229 is in its operative position as shown in Fig. 14, the port 234 is closed by the plunger 231 and the plunger 229 is held in operative position by a spring detent 236 which is carried by the valve casing and engages a groove 237 formed in the periphery of the plunger 229.

When the ram 3 stalls on its upstroke as will be described hereinafter, the plunger 229 is returned from its operative position to its neutral position by liquid delivered from the high pressure circuit to the outer end of the cylinder 231 through a pipe 238 which has a resistance valve 239 connected between itself and the drain pipe 233 for limiting the pressure of the liquid delivered to the cylinder 231. The resistance valve 239 is adjusted to open at a low pressure, for instance 100 lbs. per square inch.

The reversing valve 219 has a distributing port 240 arranged between the admission port 224 and the return chamber 227, a distributing port 241 arranged between the port 224 and a return chamber 242 which is arranged in the opposite end of the valve casing from the chamber 227, and a duct 243 which is formed in the valve casing and connects the return chambers 227 and 242 to each other so that both are always open to the pipe 226.

The flow of liquid through the reversing valve 219 is controlled by its plunger 244 which has its ends fitted in two cylinders 245 and 246 arranged upon opposite ends of the valve casing.

The cylinder 245 is connected at its outer end to a port 247 in the pilot valve 220 by a pipe 248 which has a choke 249 and a check valve 250 connected therein in parallel with each other, and the cylinder 246 is connected at its outer end to a port 251 in the pilot valve 220 by a pipe 252 which has a choke 253 and a check valve 254 connected therein in parallel with each other.

The reversing valve 219 is operated by liquid delivered from the gear pump 8 through the pilot valve 220 which has a port 255 arranged between the ports 247 and 251 and connected to the low pressure supply pipe 195.

The check valves 250 and 254 allow liquid to flow freely to the cylinders 245 and 246, respectively, tending to move the plunger 244 at high speed, and the chokes 249 and 253 restrict the discharge of liquid from the cylinders 245 and 246, respectively, to limit the speed at which the plunger 244 moves so that the valve 219 is operated quickly but smoothly.

In order to insure an adequate supply of liquid for control purposes, an accumulator 256 is connected to the supply pipe 195 and charged continuously by the pump 8 whenever the piston 208 and the valve 219 are not being operated hydraulically.

The accumulator 256 is ordinarily carried by the casing of the valve 220 and is shown as having its spring end open to the bore of the valve 220 and connected to the drain pipe 233 so that any liquid which may escape past its piston may be returned to the reservoir 193.

The flow of liquid through the pilot valve 220 is controlled by its plunger 257 which is hollow to provide communication between the port 247 and the drain pipe 233 when the plunger 257 is in the position shown in Fig. 16 at which time liquid from the pump 8 and the accumulator 256 may flow through the pipe 195, the valve 220, the pipe 252 and the check valve 254 to the cylinder 246 and force the plunger 244 to the position shown in Fig. 16 and the liquid in the cylinder 245 may exhaust through the pipe 248 and its choke 249 to the port 247 and then through the hollow plunger 257 to the drain pipe 233.

When the plunger 257 is in the position shown in Fig. 14, liquid from the pump 8 and the accumulator 256 may flow through the pipe 195, the valve 220, the pipe 248 and the check valve 250 to the cylinder 245 and force the plunger 244 in the opposite direction, and the liquid in the cylinder 246 may exhaust through the pipe 252 and its choke 253 and the valve 220 to the drain pipe 233.

The plunger 257 has a stem 258 attached thereto and provided intermediate its ends with a piston 259 for controlling communication between a port 260 and two ports 261 and 262 formed in a cylinder 263 which is ordinarily arranged upon the end of the pilot valve 220.

The piston 259 and the plunger 257 are forced rearwardly to the positions shown in Fig. 16 by liquid delivered to the cylinder 263 through a pipe 264 which has one of its ends connected to the port 261 and its other end connected to a pipe 265 through which liquid flows to and from the upper end of the ram cylinder 4.

The pipe 264 has a check valve 266 and a resistance valve 267 connected in parallel therein. The check valve 266 allows liquid to be exhausted freely from the cylinder 263 to the pipe 265 when the piston 259 moves forwardly but prevents any passage of liquid in the opposite direction except through the resistance valve 267 which is adjusted to open at a pressure above a predetermined maximum, for instance 1500 pounds per square inch.

When the ram stalls on its down stroke, the pressure will rise in the pipe 265 until the resistance valve 267 is opened and then liquid will flow through the pipe 264 to the cylinder 263 and force the piston 259 and the plunger 257 rearwardly to the positions shown in Fig. 16, thereby opening the port 251 to the port 255 and directing liquid from the pump 8 and the accumulator 256 to the cylinder 246 to move the reversing valve plunger 244 to the position shown in Fig. 16.

When the plunger 257 has arrived at the position shown in Fig. 16, the piston 259 has uncovered the port 260 which is connected to the return pipe 198 so that any additional liquid delivered through the pipe 264 is returned to the intake of the pump 7.

The piston 259 and the plunger 257 are forced forwardly to the positions shown in Fig. 14 by liquid delivered to the cylinder 263 through a pipe 268 which has one of its ends connected to the port 262 and its other end connected to a pipe 269 through which liquid flows to and from the lower end of the ram cylinder 4.

The pipe 268 has a check valve 270 and a resistance valve 271 connected in parallel therein. The check valve 270 allows liquid to be exhausted freely from the cylinder 263 into the pipe 269 when the piston 259 moves rearwardly but prevents any passage of liquid in the opposite direction except through the resistance valve 271 which is adjusted to open at a pressure above a predetermined maximum, for instance 800 lbs. per square inch.

When the ram stalls on its upstroke, the pressure will rise in the pipe 269 until the resistance valve 271 is opened and then liquid will flow through the pipe 268 to the cylinder 263 and force the piston 259 and the plunger 257 forwardly.

The pipe 268 is also connected to the pipe 238 through a resistance valve 272 which is adjusted to open at a relatively low pressure, for instance 150 lbs. per square inch.

During a cycle of operation at the end of which the press comes to rest, the piston 259 is held mechanically against forward movement and the pressure of the liquid being delivered through the pipe 268 rises until the resistance valve 272 opens, then liquid flows through the pipe 238 to the cylinder 231 and forces the piston 230 and the plunger 229 forwardly until the port 234 is uncovered, and then liquid from the pump 8 and the accumulator 256 enters the cylinder 231 and moves the piston 230 and the plunger 229 forwardly at high speed to stop the press.

The plunger 257 and the piston 259 are held against forward movement during the cycle of operation at the end of which the press comes to rest by a latch 273 which is pivoted upon the frame 1. As shown in Fig. 16, the horizontal arm of the latch 273 is in engagement at this time with a shoulder 274 formed upon a slide 275 which is secured to the outer end of the valve stem 258 and mounted for reciprocation upon a guide 276 carried by the frame 1 in a stationary position.

The latch 273 is urged into engagement with the slide 275 by a spring 277, which has one of its ends secured to the frame 1 and its other end secured to the depending arm of the latch 273, and it is adapted to be moved out of engagement with the shoulder 274 by a hook 278 which is pivoted upon a pin 279 carried by a control plate 280. The hook 278 is urged toward engagement with the depending arm of the latch 273 by a spring 281 which has one of its ends secured to the plate 280 and its other end secured to an arm of the hook 278.

The control plate 280 is arranged between the two guides 282 which are carried by the frame 1 and allow the plate 280 to move forwardly and rearwardly therebetween.

The plate 280 is moved rearwardly from the position shown in Figs. 2 and 16 to the position shown in Fig. 13 to start the press, and is moved forwardly from the position shown in Fig. 13 to the positions shown in Figs. 2 and 16 to stop the press. Further forward movement of the plate 280 is prevented by a stop 283 carried by the frame 1.

When the control plate 280 moves rearwardly, the hook 278 swings the latch 273 clear of the shoulder 274 to allow the slide 275 to move forwardly when the ram stalls at the end of its upstroke at which time liquid is delivered through the pipe 268 to the cylinder 263 to move the piston 259 forwardly as previously described.

If the press is to complete a single cycle of operation and then come to rest, the hook 278 is swung out of engagement with the latch 273 as the slide 275 moves forwardly by a cam face 284 which is formed on the slide 275 and engages a cam 285 carried by the hook 278.

When the slide 275 again moves rearwardly, the hook 278 is returned by its spring 281 to its initial position but out of engagement with the latch 273, as shown in Fig. 15.

The front end of the hook 278 has a rounded or beveled surface upon its upper edge and the lower end of the latch 273 has a rounded or beveled surface upon its rear edge so that, as the plate 280 moves forwardly, these rounded or beveled surfaces engage each other and cause the front end of the hook 278 to be depressed and thereby allowed to pass beyond the lower end of the latch 273 and in position to engage it when the plate 280 next moves rearwardly.

The cam 285 is pivoted upon the pin 279 and fixed for rotation with the hook 278 by a bolt 286 which passes through the cam 285 and is threaded into the hook 278. The cam 285 is in the position shown in the drawings when the press is adjusted to stop at the end of each cycle of operation.

If the press is to be operated continuously or until stopped by the operator, the bolt 286 is withdrawn and inserted in a hole 287 in the cam 285 which is then swung upon the pin 279 until the bolt 286 is in alinement with the threaded hole in the hook 278 and then the bolt is screwed therein.

In this position, the cam 285 is out of the path of the cam face 284 and the spring 281 will hold the hook 278 against a stop 288 carried by the plate 280. The hook 278 thus remains in engagement with the latch 273 and holds it out of engagement with the shoulder 274, thereby allowing the valve 220 to operate and start succeeding cycles of operation.

When the control plate 280 moves rearwardly, the plunger 229 of the control valve 221 is moved from the position shown in Fig. 16 to the position shown in Fig. 14 by a valve actuator 289 which is pivoted upon the plate 280 and has an arm 290 for engaging the end of the plunger 229, an arm 291 arranged below the arm 290 and parallel thereto, and a third arm 292 arranged above the arm 290 at right angles thereto.

The arm 292 carries at its upper end a pawl 293 which is pivoted thereto intermediate its ends and has its horizontal arm urged toward the slide 275 by a spring 294 which has one of its ends secured to the vertical arm of the pawl 293 and its other end secured to the plate 280.

If the press is adjusted to stop at the end of each cycle of operation, the spring 294 holds the horizontal arm of the pawl 293 against the lower side of the slide 275, as shown in Figs. 13 and 14, and, when the valve 220 is operated to move the slide 275 to the position shown in Fig. 14, the end of the pawl 293 moves behind a shoulder 295 formed in the lower side of the slide 275. Then when the pilot valve 220 is operated to move its plunger 257 to its initial position, the slide 275 is moved to its initial position and swings the actuator 289 out of alinement with the control valve plunger 229 and the latch 273 engages the shoulder 274 as shown in Fig. 15.

When the ram stalls at the end of its upstroke and liquid is delivered through the pipe 268 to the cylinder 263, the latch 273 holds the piston 259 against movement and liquid breaks through the resistance valve 272 and forces the control valve plunger 229 to its initial position, as previously described.

If the press is to be operated continuously, a stop pin 296, which is secured in the arm 292 in the position shown when the press is adjusted to stop at the end of each cycle, is moved into a hole 297 in the arm 292 in which position it holds the pawl 293 out of engagement with the slide 275 and the actuator 289 will not be swung out of alinement with the plunger 229 but will hold it against forward movement to initiate successive cycles of operation as long as the control plate 280 remains in its rearward position.

The control plate 280 is moved rearwardly to start the press by depressing a pedal 298 which is connected at its rear end to a control rod 299 and pivoted intermediate its ends upon a shaft 300 carried by one of the corner posts of the frame 1 near the bottom thereof.

The pedal 298 is urged upwardly to its neutral position by a helical compression spring 301 which encircles the rod 299 between the rear end of the pedal 298 and a part of the frame 1, and its upward movement is limited by a stop 302 carried by the frame 1.

The pedal 298 has a locking pedal 303 pivoted thereto and provided with a latch 304 to engage a bar 305 carried by the frame 1, and the latch 304 is urged away from the bar 305 by a spring 306 which has one of its ends connected to the latch 304 and its other end connected to the pedal 298.

When the pedal 298 is depressed, the press will perform a single cycle of operation and then come to rest if the bolt 286 and the pin 296 are in the positions shown in the drawings even if the pedal 298 is held down.

If the bolt 286 is inserted in the hole 287 and the pin 296 is inserted in the hole 297, the press will continue to operate as long as the pedal 298 is held down and will come to rest at the end of the cycle of operation during which the pedal is released.

If the press is to be operated continuously, the locking pedal 303 is depressed and the latch 304 engages the bar 305 and holds the pedal 298 down. To stop the press, the pedal 298 is depressed until the spring 306 retracts the latch 304 out of engagement with the bar 305 and is then released. The spring 301 then returns the pedal 298 to its neutral position and the press comes to rest at the end of the current cycle of operation.

The upper end of the control rod 299 is connected to a lever 307 which is fixed upon a control shaft 308 journaled in the frame 1 near the upper end thereof, and the shaft 308 has a lever 309 fixed thereto at an angle to the lever 307 and connected by a link 310 to the control plate 280. Consequently, depressing the pedal 298 causes the control plate 280 to move rearwardly.

The pedal 298 and the control rod 299 are ordinarily arranged upon the same side of the press as the control plate 280 but, for the purpose of illustration, the same are shown arranged upon the opposite side of the press and the shaft 308 shown extended through the frame 1.

The press may be stopped at any point in a cycle of operation by depressing the front end of a hand lever 311 which is pivoted at its rear end upon the frame 1 and connected intermediate its ends by a link 312 to one arm of a bell crank lever 313 journaled upon the shaft 308.

The other arm of the lever 313 is connected by a link 314 to the lower end of a valve operating lever 315 which is pivoted intermediate its ends upon a stationary pin 316 and has its upper end provided with an abutment 317 to engage the rear face of an enlarged head 318 secured to the stem of the control valve plunger 229.

The lever 315 has a cam 319 fixed thereto which normally engages the arm 291 of the valve actuator 289 and prevents the arm 290 thereof from being moved by the spring 294 upwardly out of alinement with the head 318 on the valve plunger 229.

When the hand lever 311 is operated, the lever 315 is swung upon the pin 316, the cam 319 swings the arm 291 downwardly and thereby moves the arm 290 out of alinement with the head 318, and the abutment 317 engages the head 318 and moves the valve plunger 229 to its neutral position, thereby stopping the press.

When the hand lever 311 is released, it and the lever 315 are returned to their initial positions by a spring 320 which has one of its ends connected to the link 314 and its other connected to the frame 1. The valve actuator 289 will then be returned to its operative position by the spring 294 as soon as the control plate 280 is moved forwardly to its initial position.

Referring now more particularly to Fig. 16, the reversing valve 219 functions to direct working liquid from the pump 7 either into a pipe 321, which has one of its ends connected to the port 240 and its other end connected to a port 322 formed in the feed motor 102 intermediate the ends thereof, or into a pipe 323 which has one of its ends connected to the port 241 and its other end connected to a port 324 formed in the feed motor 103 intermediate the ends thereof.

The feed motor 102 has a port 325 arranged near its inner or gland end and connected by a pipe 326 to the head end of the clamping cylinder 66, and the feed motor 103 has a port 327 arranged near its inner or gland end and connected by a pipe 328 to the rod end of the clamping cylinder 66.

The pipe 321 is connected to the pipe 326 through a check valve 329, which allows liquid to flow from the pipe 326 to the pipe 321 but prevents it from flowing in the opposite direction, and it is connected to the pipe 265 by a pipe 330 which has a check valve 331 connected therein to allow liquid to flow from the pipe 265 to the pipe 321 but to prevent it from flowing in the opposite direction.

The pipe 323 is connected to the pipe 328 through a check valve 332, which allows liquid to flow from the pipe 328 to the pipe 323 but prevents it from flowing in the opposite direction, and it is connected to the pipe 269 through a check valve 333 which allows liquid to flow from the pipe 269 to the pipe 323 but prevents it from flowing in the opposite direction.

The pipe 323 is connected also to the pipe 252 through a check valve 334 which allows gear pump liquid to flow from the pipe 252 into the pipe 323 but prevents liquid from flowing in the opposite direction.

The pipe 321 is connected through a branch pipe 335 and a check valve 336 to a dashpot 337 which is formed in the outer end of the cylinder of the feed motor 102 to receive a dash-pot plunger 338 which is arranged upon the end of the plunger 104, and the branch pipe 335 is connected through a check valve 339 and a choke 340 to a port 341 which is formed in the cylinder of the feed motor 102 at the end of the path of travel of the plunger 104.

The check valves 336 and 339 allow liquid to flow freely from the branch pipe 335 to the motor 102 but prevent it from flowing in the opposite direction so that all liquid expelled from the motor 102, after the plunger 104 closes the port 322, must be forced through the choke 340 and, after the plunger 338 enters the dashpot 337, any further movement of the plunger 104 requires that liquid trapped in the dashpot 337 be squeezed out between the walls of the dashpot and the plunger 338.

The motor 103 is constructed and connected in circuit in substantially the same manner as the motor 102. The plunger 105 has a dashpot plunger 342 arranged upon its outer end to enter a dashpot 343 formed in the end of the motor cylinder, the pipe 323 is connected through a branch pipe 344 and a check valve 345 to the dashpot 343, and the branch pipe 344 is connected through a check valve 346 and a choke 347 to a port 348 formed in the cylinder of the motor 103 at the end of the path of travel of the plunger 105.

When the control valve plunger 229 is moved rearwardly to close communication between the port 225 and the port 228 and to open communication between the port 222 and the port 228, liquid from the high pressure pump 7 flows through the supply pipe 197, the valve 221, the pipe 223, the valve 219, the pipe 323, the branch pipe 344 and the check valves 345 and 346 to the dashpot 343 and the port 348, thereby acting upon the entire area of the plunger 105 and forcing it to the right in respect to Fig. 16.

After the end of the plunger 105 uncovers the port 324, liquid may flow directly from the pipe 323 into the motor 103 and continue to force the plunger 105 to the right until it uncovers the port 327 and then the liquid will flow through the pipe 328 to the rod end of the clamping cylinder 66 to operate its piston 68 as will be presently described.

Movement of the plunger 105 to the right causes the rack 101 to operate the feed mechanism and liquid to be expelled from the motor 102 through the pipe 321, the valve 219 via the port 240 and the return chamber 227, the pipe 226, and the valve 221 via the port 225 to the return pipe 198.

During the first part of the movement of the plunger 104, liquid is exhausted freely through the port 322 and the plunger 104 moves at high speed until it closes the port 322 and then the liquid expelled from the motor 102 must flow through the choke 344, thereby decelerating the rack 101. After the dashpot plunger 338 enters the dashpot 337, the rack 101 is decelerated still further and the feeding mechanism is brought gradually to rest without shock or impact.

When the plunger 244 of the reversing valve 219 is moved rearwardly, driving liquid flows through the pipe 321 to the motor 102 and moves the plungers 104 and 105 and the rack 101 to the left in respect to Fig. 16, and liquid is exhausted from the motor 103 through the pipe 323, the valve 219, the pipe 226 and the valve 221 to the return pipe 198. The exhaust liquid flows through the valve 219 via the port 241, the return chamber 242, the duct 243 and the return chamber 227.

The choke 347, the check valves 345 and 346, the port 348 and the dashpot function in the manner just described and the feed mechanism is gradually decelerated and brought to rest quickly and smoothly.

After the plunger 104 uncovers the port 325, the driving liquid flows through the pipe 326 to the head end of the clamping cylinder 66 and forces the piston 68 forwardly to operate the grippers.

The clamping cylinder 66 is thus connected in series with the feed motor, and the feed mechanism is brought substantially to rest before the grippers are operated. Likewise, the cylinder 66 is connected in series with the ram cylinder 4 so that the ram 3 is operated after the grippers have been operated.

The cylinder 66 has two ports 349 and 350 arranged intermediate its ends and covered by the piston 68 until it reaches the end of its stroke in either direction, at which time one of the ports is uncovered and liquid may flow through the cylinder 66 to the ram cylinder 4 to operate the ram 3.

The pipe 269 has one of its ends connected to the port 349 and its other end connected through a check valve 351 and a low pressure resistance valve 352 to one end of a pipe 353 the other end of which is connected to the lower end of the pressure chamber 15 in the ram cylinder 4.

The check valve 351 allows liquid to flow freely from the pipe 269 to the pipe 353 but prevents it from flowing in the opposite direction except through the resistance valve 352 which is adjusted to open at a low pressure, for instance 100 lbs. per square inch. The function of the resistance valve 352 is to prevent the ram 3 from descending until pressure is applied to its upper end.

The pipe 265 has one of its ends connected to the port 350 and its other end connected to a port 354 in the ram cut-out valve 168. The port 354 is normally open to a port 355 which is connected by a branched pipe 356 to the pressure chamber 17 and to the upper end of the pressure chamber 15.

Thus, driving liquid delivered through the pipe 321 first operates the feed motor 102 until the plunger 104 reaches the end of its stroke, then flows through the pipe 326 and advances the piston 68 to the end of its stroke, and then flows through the pipe 265, the valve 168 and the pipe 356 to the pressure chambers 15 and 17 and advances the ram 3.

Driving liquid delivered through the pipe 323 first operates the feed motor 103 until its plunger 105 reaches the end of its stroke, then flows through the pipe 328 and retracts the piston 68 to the end of its stroke and then flows through the pipe 269, the check valve 351 and the pipe 353 to the lower end of the pressure chamber 15 and retracts the ram 3.

Referring now more particularly to Figs. 17 to 21, the frame of the magazine 5 has a vertical web 400 which is provided with feet or bases 401 for supporting it and has two or more brackets 402 arranged upon its front face for supporting a stack of the strips 6.

The rear face of each bracket 402 abuts the front face of the web 400 and is provided with a lug 403 which extends through a vertical slot 404 in the web 400 and is provided upon opposite sides of its rear end with two rollers 405 which engage the rear face of the web 400, thereby holding the bracket against lateral movement but permitting it to be moved vertically.

The web 400 is provided with a number of the slots 404 which are spaced apart a suitable distance, for instance 8 inches. The bracket 402 nearest the discharge end of the magazine ordinarily has its lug 403 arranged in the end slot 404 and each of the other brackets has its lug 403 arranged in any of the other slots 404 depending upon the length of the strip 6.

The strips are supported between the brackets 402 by bars 406 each of which is supported by at least two of the brackets 402. As shown, each bracket has a recess 407 of sufficient width to accommodate two bars 406, or a bar 406 and a filler 408, so that the outer ends of the bars may be moved toward the center line of the magazine to provide for strips of different lengths and to allow the front end of the stack of strips to be adjusted relatively to the center line of the dies 28 and 30.

Each bracket is supported and adjusted as to height by a chain 409 which has its lower end connected to the rear end of the lug 403. Each chain 409 partially encircles and is supported by a sprocket wheel 410 which is arranged upon a shaft 411 journaled in bearings 412 and 413 carried by the web 400, and each sprocket 410 has a bearing 412 arranged adjacent thereto.

The sprocket 410 nearest the discharge end of the magazine is ordinarily fixed to the shaft 411 but the other sprocket 410 is splined thereon. When the bracket 402 is moved to a new location, the corresponding sprocket 410 and the bearing 412 adjacent thereto are also moved to that location, the web 400 being provided with suitable bolt holes adjacent each slot 404 for receiving the bolts which secure the bearing 412 in position.

The shaft 411 has a gear 414 secured upon its outer end and in mesh with a vertically movable rack 415 which is held in mesh with the gear 414 by a roller 416 carried by an extension 417 of the bearing 413.

The rack 415 is connected by a piston rod 418 to the piston 419 of a hydraulic motor which has its cylinder 420 secured in a stationary position, as by being attached to the web 400.

Delivery of driving liquid to the upper end of the cylinder 420 will force the piston 419 downwardly and cause the rack 415 to rotate the gear 414 and the shaft 411 and thereby raise the brackets 402 and the strips 6 supported thereon. Delivery of liquid to the lower end of the cylinder 420 will raise the piston 419 and cause the brackets 402 to be lowered.

Liquid for operating the piston 419 is supplied by a small capacity constant delivery pump 421, such as a gear pump, which is driven in any suitable manner, as by means of a pulley 422, and draws liquid from a reservoir 423 through a suction pipe 424 and delivers it to a supply pipe 425. As such pumps are well known, the pump 421 and its connections has been shown schematically in Fig. 20.

The delivery of liquid to the cylinder 420 is controlled by a valve 426 which has a central port 427 to which the pipe 425 is connected, a port 428 arranged above the port 427 and connected by a pipe 429 to the upper end of the cylinder 420, and a port 430 arranged below the port 427 and connected by a pipe 431 to the lower end of the cylinder 420. The valve 426 is also connected at each of its ends to a discharge pipe 432 which exhausts into the reservoir 423.

The ports 428 and 430 are normally closed by the plunger 433 of the valve 426 and, when these ports are closed, the liquid discharged by the pump 421 is exhausted through a resistance valve 434 which is connected between the supply pipe 425 and the discharge pipe 432.

The supply pipe 425 is connected also to the reservoir 423 by a pipe 435 having a check valve 436 connected therein which allows liquid to be drawn from the reservoir 423 into the pipe 425 but prevents it from flowing in the opposite direction.

The valve 426 has a helical compression spring 437 arranged in the lower end of its casing and acting upon the lower end of the plunger 433 which has a stem 438 attached to its upper end and connected by links 439 to a control lever 440 intermediate the ends thereof.

The control lever 440 is provided at its rear end with a handle 441 for operating the valve 426 manually and is pivoted at its front end upon the right end of a control shaft 442 which is journaled in the bearings 412 and 413.

The shaft 442 has a crank 443 secured thereon adjacent the control lever 440, to which it is connected by a removable pin 444, and a contact lever 445 arranged intermediate its ends at an angle to the crank 443 and secured in adjusted positions upon the shaft 442 as by means of a set screw 446.

The front end of the contact lever 445 normally rests upon the top of the stack of strips 6 in the magazine 5 and is urged downwardly in engagement therewith by the action of the spring 437 when the control lever 440 is connected by the pin 444 to the crank 443.

The contact lever 445 is so adjusted upon the shaft 442 that it holds the pistons of the valve plunger 443 over the ports 428 and 430 when the top of the stack of strips 6 is at the desired height relatively to the lower die 30.

When the top strip 6 is fed from the magazine into the press, it moves from beneath the contact lever 445 and the spring 437 urges the plunger 433 upwardly until the end of the lever 445 engages the next strip 6 in the stack and, when one or more of the strips 6 have been removed from the magazine, the plunger 443 will have been raised sufficiently to open the port 428 to the port 427 and the port 430 to the discharge pipe 432.

Liquid from the pump 421 may now flow through the valve 426 and the pipe 429 to the upper end of the cylinder 420 and force the piston 419 downwardly and thus raise the brackets 402 and the stack of strips 6 carried thereby, liquid being expelled from the lower end of the cylinder 420 through the pipe 431 and the valve 426 into the discharge pipe 432.

As the stack of strips 6 rises, the front end of the contact lever 445 is raised and the rear end of the control lever 440 is depressed until the plunger 433 covers the ports 428 and 430 and thereby arrests the movement of the piston 419. The stack of strips then remains at rest until one or more additional strips 6 are removed and then the stack of strips is again raised in the same manner.

When the stack of strips 6 is exhausted, further upward movement of the bracket 402 is prevented by a collar 447 which is arranged upon the piston rod 418 and is ordinarily fixed in adjusted positions thereon by a set screw 448.

The brackets 402 may then be lowered by depressing the handle 441 to lower the plunger 433 against the resistance of spring 437 and, as the brackets ordinarily move slowly due to the small capacity of the pump 421, the plunger 433 may be retained in its lower position by a spring pressed latch 449 which is arranged upon the cylinder of the valve 426 and engages a collar 450 arranged upon the stem 438 and secured in adjusted position thereon by a set screw 451.

Lowering the plunger 433 opens the port 428 to the discharge pipe 432 and the port 430 to the port 427 so that liquid from the pump 421 may flow through the valve 426 and the pipe 431 to the lower end of the cylinder 420 and raise the piston 419 and liquid may be exhausted from the upper end of the cylinder 420 through the pipe 429 and the valve 426 to the exhaust pipe 432.

It is sometimes desirable to lower the bracket 402 when the same is supporting a stack of strips which has sufficient weight to move the piston 419 independently of the pump 421. In which case, the piston 419 expels liquid from the upper end of the cylinder 420 through the pipe 429 and the valve 426 to the exhaust pipe 432 and the liquid required to fill the lower part of the cylinder 420 in excess of the volume delivered by the pump 421 is drawn from the reservoir 423 through the pipe 435 and the check valve 436.

When a stack of strips 6 is to be placed in the magazine 5, the pin 444 is withdrawn and the contact lever 445 is swung upwardly and rearwardly to a position clear of the path of the incoming strips and is secured in that position by inserting the pin 444 in a hole 452 formed in the lever 440.

The stack of strips 6 is positioned transversely of the magazine 5 by two or more backing plates 453 which are arranged in vertical alinement with a corresponding number of the slots 404 and are secured in position by bolts 454 which extend through the slots 404 and have washers 455 arranged thereon upon both sides of the web 400. The washers upon the front side of the web 400 may be varied as to number or thickness to move the back plates 453 forwardly or rearwardly and thereby adjust the magazine to accommodate strips of different widths.

The stack of strips is so adjusted longitudinally of the magazine that the end of each strip will arrive in the correct position between the dies 28 and 30 when that strip has been advanced by the grippers 34 during a predetermined number of reciprocations thereof.

The position of the stack longitudinally of the magazine is determined by an end stop 456 against which the ends of the strip abut.

The stop 456 is secured in adjusted position upon the web 400 by bolts 457 which extend through slots 458 formed in the web 400 to allow the stop to be moved longitudinally thereof.

The uppermost strips 6 are urged against the back plate 453 by front guides 459 each of which is carried by a bracket 460 and arranged opposite a back plate 453.

The brackets 460 are secured by bolts 461 to the web 400 which has bolt holes 462 so arranged therein that a bracket 460 may be secured by its bolts 461 in position beneath any one of the slots 404.

Each bracket 460 has a horizontal arm 463 extending forwardly therefrom and supporting upon its upper edge a shoe 464 to which the lower end of a guide 459 is pivoted.

The shoe 464 is secured in adjusted position upon the arm 463 by two bolts 465 which are adapted to be inserted in any two of a number of holes 466 arranged in a horizontal row in the arm 463. The shoe is movable upon the arm 463 to adjust the guide 459 to strips of different widths.

The rear face of the guide has a surface 467, which is normally inclined rearwardly, and a relatively short surface 468 which is normally vertical and held in engagement with the front of the stack by an eyebolt 469 and a hand wheel 470.

The eyebolt 469 is pivoted to the web 400 at the top thereof and extends between two lugs 471 formed upon the upper end of the guide 459, and the hand wheel 470 normally engages the front of the lugs 471 and holds the vertical surface 468 against the front edges of the uppermost strip or strips in the stack and thereby holds the rear edges of these strips substantially in engagement with the adjacent back plate 453.

When strips are to be placed in the magazine, the hand wheels 470 are loosened, the eyebolts 469 swung upwardly and rearwardly and the guides 459 swung forwardly and downwardly, thereby providing free access to the magazine. The downward movement of each guide 459 is limited by a lug 472 which is provided at the lower end thereof to engage an abutment 473 arranged upon the shoe 464.

The uppermost strips in the stack are urged against the stop 456 by an end guide 474 which is arranged at the other end of the stack and supported by a bracket 475 carried by the web 400.

The bracket 475 is secured to the web 400 by three bolts 461 which are arranged in the same formation and have the same spacing as the bolts 461 in the brackets 460. The bolts 461 are arranged in the bracket 475 in this manner in order that it may be attached to the web 400 either in the position shown or below any one of the slots 404.

The bracket 475 has a horizontal arm 476 extending parallel to the web 400 and supporting upon its upper edge a shoe 477 to which the lower end of the end guide 474 is pivoted.

The shoe 477 is secured in adjusted position upon the arm 476 by two bolts 478 which are adapted to be inserted in any two of a number of holes 479 arranged in a horizontal row in the arm 476. The shoe 477 is movable upon the arm 476 to adjust the guide 474 to strips of different lengths.

The inner face of the guide 474 has a surface 480 which is normally inclined toward the top of the stack and joins at its upper end a surface 481 which is normally vertical and held in engagement with the end of the stack by a screw 482 threaded through a bracket 483 secured to the web 400 by bolts 484.

The screw 482 is provided at its outer end with a hand wheel 485 and its inner end engages the upper end of the guide 474 to hold the surface 481 against the end of the stack and thereby hold the other end of the uppermost strip substantially in engagement with the stop 456.

If a stack of strips placed in the magazine is considerably longer or shorter than the strips for which the magazine is adjusted, the bracket 475 is removed from the web 400 and moved longitudinally thereof until its bolts 461 can be inserted in the corresponding group of holes 462 next beyond the end of the stack. The bracket 483 is then removed from the web 400 and moved to a new position corresponding to the new position of the bracket 475 and secured in this position by inserting its bolts 484 through holes 486 which are formed in the web 400 at the correct distance from each slot 404.

When a stack of strips has been placed in the magazine and the guides 459 and 474 adjusted and when strips are being removed from the top of the stack and fed through the press so that the stack is raised by the magazine mechanism, any strip which does not have its rear edge in engagement with the back plate 453 and its forward end in engagement with the stop 456 will be shifted into engagement therewith by the inclined surfaces 467 and 480 so that, as each strip reaches the top of the stack, it is in the same position as the preceding strip.

The magazine is arranged at an angle to the path followed by the strip as the same are fed through the press, and the inner or forward end of each strip is swung rearwardly by the transfer mechanism so that the nearer gripper 34 may engage the rear edge thereof.

If the strip being transferred from the magazine to the press is relatively long, its outer end will swing forwardly as its inner end is swung rearwardly by the transfer mechanism, and the upper end of one of the back plates 455 is ordinarily extended above the top of the stack to function as a fulcrum about which the strip swings. The upper ends of the other back plates and the upper ends of the guides are arranged slightly below the top strip in the stack to allow it to swing over them.

After the forward end of the top strip has been swung rearwardly by the transfer mechanism, the nearer gripper 34 seizes and advances it a predetermined distance, then releases it and is then retracted to reengage the strip and advance it again. The gripper may be retracted several times before the strip is engaged by either the detent 178 or the dies 28 and 39 and, in order to avoid any danger of the strip being retracted by the grippers during retraction thereof, a detent 487 is pivoted upon one of the eyebolts 469 and allows the top strip to advance freely but presses it against the strip beneath whenever it tends to retract.

The detent 487 is held against movement along the eyebolt 469 by suitable collars 488 arranged thereon, and is preferably carried by the eyebolt 469 arranged above the back plate 453 which acts as a fulcrum when the end of the strip is swung rearwardly by the transfer mechanism.

Assuming that the press is idle and that a stack of strips has been arranged in adjusted position within the magazine 5, the press will operate as follows when the pumps 7, 8 and 421 are started:

The pump 421 will deliver liquid to the upper end of the cylinder 420 and force the piston 419 downwardly to raise the stack of strips in the magazine. As the stack approaches the limit of its upward movement, it raises the front end of the contact lever 445 and thereby depresses the rear end of the control lever 440 until the top of the stack is at the desired height, at which time the ports 428 and 430 are closed by the plunger 433 and then the liquid delivered by the pump 421 will be exhausted through the resistance valve 434 into the reservoir 423.

The high pressure pump 7 will discharge liquid into the supply pipe 197 and this liquid will flow through the control valve 221 and the return pipe 198 to the intake of the pump 7.

The gear pump 8 will deliver liquid through the low pressure supply pipe 195, the pilot valve 220, the pipe 252, the check valve 334, the pipe 323, the feed motor 103, the pipe 328, the clamping motor cylinder 66, the pipe 269, the check valve 351 and the pipe 353 to the lower end of the pressure chamber 15 and, if the ram 3 has dropped, the liquid will raise it to its upper position.

The liquid in the cylinder 66 holds the clamping piston 68 in its retracted position and the liquid in the motor 103 holds the rack 101 to the right.

After the ram 3 has been raised, it is supported in its upper position by liquid trapped in the lower part of the chamber 15 by the check valve 351 and the resistance valve 352 when the pilot valve 220 is operated to close communication between the pipe 252 and the supply pipe 195.

The gear pump 8 also delivers liquid through the supply pipe 195 to the accumulator 256 and charges it, and then the gear pump exhausts through the relief valve 196 which causes it to maintain a predetermined low pressure in the supply pipe 195.

Pressure from the pipe 195 extends through the pump control valve 121 and the pipe 214 to the outer end of the cylinder 209 and holds the pump 7 at its maximum adjusted stroke, through the pilot valve 220 and the pipe 252 to the cylinder 246 on the reversing valve 219 and holds the valve plunger 244 to the left, and through the pipe 235 to the cylinder 231 on the control valve 221 and acts upon the piston 230 to hold the control valve plunger 229 to the left.

The press may now be started by depressing the pedal 298 to move the control plate 280 rearwardly and cause the actuator 289 to move the plunger 229 of the control valve 221 from the position shown in Fig. 16 to that shown in Fig. 13.

The plunger 229 is held in this position by the detent 236 engaging the groove 237, and the piston 230 closes the port 234 as shown in Fig. 14.

The pedal 298 need not be held down, as the press will perform a single cycle of operation and then come to rest unless it is desired that the press operate continuously until stopped by the operator, in which case the pin 296 is inserted in the hole 297 to hold the pawl 293 out of engagement with the shoulder 295 on the slide 275, the cam 285 is secured to the hook 278 with the bolt 286 passing through the hole 287 to hold the inclined face of the cam 285 out of engagement with the cam face 284 on the slide 275, and the pedal 303 is depressed to engage the latch 304 with the bar 305 and hold the pedal 298 down, thereby maintaining the horizontal arm 290 of the actuator 289 in engagement with the head 318 to hold the valve plunger 229 in its operative position.

As the control plate 280 moves rearwardly, the hook 278 swings the latch 273 out of engagement with the shoulder 274 on the slide 275 and, as the plunger 229 moves inwardly, liquid in the cylinder 231 is exhausted through the pipe 235 against the gear pump pressure until the piston 230 closes the port 234 and it is then exhausted through the pipe 238 and the resistance valve 239 into the drain pipe 233.

The port 228 in the control valve 221 is now closed to the port 225 and open to the port 222, and liquid from the pump 7 flows through the supply pipe 197, the valve 221, the pipe 223, the reversing valve 219, the pipe 323, the feed motor 103 the pipe 328, the clamping cylinder 66, the pipe 269, the resistance valve 271, and the pipe 268 to the cylinder 263 where its acts upon the piston 259 and causes it to move the slide 275 and the plunger 257 to the left to the position shown in Fig. 14 at which time the port 260 is partly uncovered and any additional liquid delivered into the cylinder 263 after the piston 259 reaches the limit of its movement may flow into the return pipe 198.

If the press is adjusted to stop at the end of each cycle of operation, the cam face 284 on the slide 275 will engage the cam 285 and swing the hook 278 out of engagement with the lower end of the latch 273 and thereby allow the spring 277 to swing the upper end of the latch 273 against the top of the slide 275 and in position to drop behind the shoulder 274 when the slide 275 moves to the right so as to prevent the pilot valve from being operated at the end of the cycle.

If the press is to operate continuously, the bolt 286 holds the cam 285 out of alinement with the cam face 284 and the hook 278 continues to hold the latch 273 out of alinement with the shoulder 274 so that the pilot valve may initiate successive cycles of operation until the press is stopped by the operator.

As the plunger 257 and the piston 259 move to the left, liquid is exhausted from the valve 220 through the bore of the hollow plunger 257 into the drain pipe 233 and from the cylinder 263 through the pipe 264, the check valve 266, the pipe 265, the check valve 331, the pipes 330 and 321, the reversing valve 219, the pipe 226 and the port 255 in the control valve 221 to the return pipe 198.

The port 251 in the pilot valve 220 is now closed to the port 255 and open to the drain pipe 233, and the port 247 is closed to the drain and open to the port 255. Liquid from the gear pump 8 and the accumulator 256 now flows through the pipe 195, the valve 220, the pipe 248 and the check valve 250 to the cylinder 245 and forces the plunger 244 of the reversing valve 219 to the right, and liquid is expelled from the cylinder 246 through the choke 253, the pipe 252 and the valve 220 to the drain pipe 233.

The port 224 in the reversing valve 219 is now closed to the port 241 and open to the port 240 so that the flow of high pressure liquid is diverted from the pipe 323 through the pipes 321 and 335 and the check valves 336 and 339 to the outer end of the feed motor 102 where it acts upon the plunger 104 and moves it and the rack 101 to the left.

As previously described, the rack 101 rotates the shaft 98 and thereby causes the grippers 34 to be advanced and the clutch shaft 109 to be rotated, and the rack 101 and its associated mechanism are operated at high speeds until the plunger 105 closes the port 324 in the feed motor 103 and are then gently decelerated to a complete stop.

When the plunger 104 reaches the end of its inward stroke, it uncovers the port 325 and the high pressure liquid flows through the motor 102 and the pipe 326 to the rear end of the clamping cylinder 66 and advances the piston 68 to open the grippers 34 and to advance the control chain 122 a distance equal to the length of one of its links, as previously described.

The piston 68 expels liquid from the forward end of the cylinder 66 through the pipe 328, the check valve 332, the pipe 323, the valve 219, the pipe 226 and the port 225 of the valve 221 to the return pipe 198.

When the plunger 68 reaches the end of its forward stroke, it uncovers the port 350 and the high pressure liquid flows through the cylinder 66, the pipe 265, the cutout valve 168 and the pipe 356 to the upper ends of the pressure chambers 15 and 17 and forces the ram 3 downwardly, and liquid is expelled from the lower part of the chamber 15 through the pipe 353, the resistance valve 352, the pipe 269, the check valve 333, the pipe 323, the valve 219, the pipe 226 and the port 225 in the valve 221 to the return pipe 198.

When the ram stalls at the end of its down stroke, the pressure rises in the pipe 265 and liquid breaks through the high pressure resistance valve 267 and flows through the pipe 264 to the cylinder 263 and moves the piston 259, the slide 275 and the plunger 257 of the pilot valve 220 to the right to the position shown in Fig. 16 at which time the plunger 259 has partly uncovered the port 260 and any liquid flowing in the pipe 264 after the pilot valve 220 has been operated escapes into the return pipe 198.

If the press is adjusted to stop at the end of each cycle of operation, the shoulder 295 on the slide 275 enages the end of the pawl 293 and swings the arm 290 of the actuator 289 out of alinement with the head 318 on the control valve plunger 229 when the slide 275 moves rearwardly so that the control valve plunger 229 may be returned to its neutral position at the end of the cycle.

If the press is adjusted to operate continuously until stopped by the operator, the pin 296 holds the pawl 293 out of alinement with the shoulder 295 and the arm 290 of the valve actuator 289 remains in engagement with the head 318 and holds the control valve plunger 229 in its operative position.

Moving the pilot valve plunger 257 to the right opens the port 251 to the port 255 and the port 247 to the drain pipe 233, and liquid from the low pressure pump 8 and the accumulator 256 flows through the pipe 195, the valve 220, the pipe 252 and the check valve 254 to the cylinder 246 and moves the plunger 244 of the reversing valve 219 to the left.

Liquid is expelled by the plunger 244 from the cylinder 245 through the choke 249, the pipe 248 and the pilot valve 220 to the drain pipe 233.

The port 241 is now open to the port 224 and the port 240 is open to the pipe 226 and liquid from the high pressure pump 7 flows through the supply pipe 197, the control valve 221, the pipe 223, the reversing valve 219, the pipes 323 and 344 and the check valves 345 and 346 to the feed motor 103 and forces the plunger 105 to the right to retract the grippers 34 to their initial positions.

As previously described, liquid is expelled from the feed motor 102 first through the port 322 and then through the port 341, and the feed mechanism is operated at high speed until the plunger 104 closes the port 322 and is then decelerated and brought gently to rest by the action of the choke 340 and the dashpot 337.

When the feed motor plunger 105 reaches the end of its stroke, it uncovers the port 327 and the high pressure liquid flows through the feed motor 103 and the pipe 328 to the forward end of the clamping cylinder 66 and moves its piston 68 rearwardly thereby operating the clamping mechanism and closing the grippers 34.

The plunger 68 expels liquid from the rear end of the clamping cylinder 66 through the pipe 326, the check valve 329, the pipe 321, the reversing valve 219, the pipe 226 and the port 225 of the control valve 221 to the return pipe 198.

When the plunger 68 reaches the end of its stroke, it uncovers the port 349 and the high pressure liquid flows through the cylinder 66, the pipe 269, the check valve 351 and the pipe 353 to the lower end of the pressure chamber 15 and forces the ram 3 upwardly, and liquid is exhausted from the pressure chamber 17 and from the upper end of the pressure chamber 15 through the pipe 356, the cutout valve 168, the pipe 265, the check valve 331, the pipes 330 and 321, the reversing valve 219, the pipe 226 and the port 225 in the control valve 221 to the return pipe 198.

When the ram stalls at the end of its upstroke, for instance by the platen 2 abutting the stop pin 19 carried by the collar 21 on the lower section of the ram cylinder 4, the pressure rises in the pipe 268 and liquid breaks through the resistance valve 271 and enters the cylinder 263 on the pilot valve 220.

If the press is adjusted to stop at the end of each cycle of operation, the liquid entering the cylinder 263 cannot move the piston 259 to the left as it is held against movement by the latch 273 engaging the shoulder 274 on the slide 275, and the pressure in the pipe 268 will rise still higher and liquid will break through the low pressure resistance valve 272 and flow through the pipe 238 to the cylinder 231 and force the piston 230 to the left until it uncovers the port 234 and then liquid from the gear pump 8 and the accumulator 256 will act upon the piston 230 and cause it to move the control valve plunger 229 quickly to its neutral position. Any liquid forced through the resistance valve 272 in excess of the volume required to operate the control valve 221 escapes through the low pressure resistance valve 239 into the drain pipe 233.

The liquid delivered by the pump 7 is now bypassed through the control valve 221, as previously described, and the press comes to rest.

If the press is adjusted to operate continuously until stopped by the operator, the liquid entering the cylinder 263 from the pipe 268 moves the piston 259 to the left to initiate another cycle of operation.

As previously described, the cam 155 and the pins 167 are adjusted on the control chain 122 in such positions that the transfer mechanism and the ram cutout valve will be operated during certain predetermined cycles of operation.

When a strip is to be placed in position to be fed into the press, as when the press first starts to operate upon strips of a certain length or when the end of the preceding strip has passed the discharge end of the magazine, the control chain 122 moves a cam 155 under and beyond the rear end of the lever 116 and raises it at the same time that the grippers 34 are opened by the clamping piston 68 being advanced.

Raising the rear end of the lever 116 causes the front end thereof to enter the detent 119 and to depress the stem 120 of the pump control valve 121 and the arm 117 to move the clutch jaw 115 into engagement with the clutch jaw 114.

Depressing the valve stem 120 opens the port 215 to the port 212 and the port 213 to the drain pipe 218 so that liquid from the pump 8 and the accumulator 256 now flows through the valve 121 and the pipe 216 to the inner end of the cylinder 209 and reduces the stroke of the pump 7 to the predetermined minimum, thereby slowing down the press to provide ample time for the transfer mechanism to operate.

When the feed motor 103 is energized to retract the grippers to their initial position, the chain 107 rotates the clutch shaft 109 and, as the clutch jaws 114 and 115 are now engaged, the crankshaft 111 is also rotated and the suction cup 142 is swung forwardly and downwardly into engagement with the top strip in the magazine and then swung upwardly and rearwardly to move the end of the strip into position to be engaged by the nearer gripper 34, as previously described.

The suction cup 142 and the gripper 34 reach their initial or starting positions at substantially the same time and the end of the strip 6 is moved between the jaws of the gripper nearer the magazine as the suction cup and the gripper approach the end of their movements.

The gripper then seizes the strip, advances it toward the dies and then releases it. As the strip advances, it carries the suction cup 142 with it until the valve stem 145 abuts the arm 132 and opens the air valve 144 to release the strip.

When the gripper advances the strip, the chain 107 rotates the clutch shaft 109 in the opposite direction and the clutch jaw 115 is forced out of engagement with the clutch jaw 114 by the inclined rear faces on the teeth thereof and thereby moves the lever 116 out of the detent 119, as previously described.

The lever 116 is then returned fully to its neutral position by the spring 118 and the spring 123 raises the plunger 217 of the pump control valve 121 so that liquid from the pump 8 flows to the cylinder 209 to increase the stroke of the pump to its preadjusted maximum. The press then operates at full speed until the valve 121 is again operated to decelerate the press and allow another strip to be placed in position to be engaged by the gripper.

During the succeeding cycles of operation, the strip is advanced intermittently by the gripper 34 and prevented by the detent 487 from being retracted by the gripper during retraction thereof until it is engaged by the detent 178 at which time the strip may have passed beyond the detent 487.

When the strip has been advanced until its forward end partly overlaps the lower die, at which time the rear end of the preceding strip may also partly overlap the lower die, a pin 167 on the control chain 122 operates the lever 175 and thereby prevents the ram from descending during that cycle of operation, as previously described.

The control chain 122 is advanced another step during the next cycle of operation, and the pin 167 will operate the lever 175 to open the cutout valve 168 so that the ram is operated during the succeeding cycles of operation.

The ram cutout valve 168 and the transfer mechanism are both operated at the same point in the cycle of operation, and they may both be operated in the same cycle but are ordinarily operated in different cycles.

After the press has been operating continuously, it may be brought to rest by depressing the pedal 298 until the latch 304 is disengaged from the bar 305 and then releasing the pedal 298. The spring 301 will then raise the pedal 298 and the control rod 299 and thereby move the control plate 280 forwardly to its initial position.

As the control plate 280 reaches its initial position, the latch 273 is swung by the spring 277 behind the shoulder 274 on the slide 275 so that the piston 259 will be held against movement to the left when the ram stalls on its upstroke and liquid breaks through the resistance valve 271. Consequently, the liquid will break through the resistance valve 272 and flow through the pipe 238 to the cylinder 231 and force the control valve plunger 229 to its initial position so that the liquid delivered by the pump 7 is bypassed as previously described. The press thus comes to rest at the end of the cycle of operation during which the pedal 298 is raised.

The invention herein set forth is susceptible of various modifications without departing from the scope thereof as hereafter claimed.

This invention is hereby claimed as follows:

1. In a press having dies for operating upon the work and feeding mechanism for passing strips of work therethrough, the combination of a magazine for containing a stack of said strips, means for automatically transferring strips from said magazine to said feeding mechanism, means for elevating said stack to move the top strip thereof into position to be engaged by said transferring means, and means responsive to variations in the elevation of the top of said supply of strips in said magazine for controlling said elevating means.

2. In a press having dies for operating upon the work and feeding mechanism for passing strips of work therethrough, the combination of a magazine for containing a stack of said strips, means for automatically transferring strips from said magazine to said feeding mechanism, hydraulic means for elevating said stack to move the top strip thereof into position to be engaged by said transferring means, and means responsive to variations in the elevation of the top of said supply of strips in said magazine for controlling said elevating means.

3. In a press having dies for operating upon the work and feeding mechanism for passing strips of work therethrough and hydraulic means for operating said feeding mechanism, the combination of a magazine for containing a stack of said strips, means operated by said hydraulic means for automatically transferring strips from said magazine to said feeding mechanism, hydraulic means for elevating said stack to move the top strip thereof into position to be engaged by said transferring means, and means responsive to variations in the elevation of the top of said supply of strips in said magazine for controlling said elevating means.

4. In a press having dies for operating upon the work and feeding mechanism for passing strips of work step by step therethrough and means for driving said press at a predetermined speed, the combination of a magazine for containing a supply of said strips, transfer mechanism for transferring strips from said magazine to said feeding mechanism during predetermined intervals, and means set in action by said feeding mechanism for automatically decelerating said press during each interval said transfer mechanism is in operation.

5. In a press having dies for operating upon the work and feeding mechanism for passing strips of work step by step therethrough and means for driving said press at a predetermined speed, the combination of a magazine for containing a supply of said strips, transfer mechanism for transferring strips from said magazine to said feeding mechanism during predetermined intervals, and means set in action by said feeding mechanism for automatically decelerating said press during each interval said transfer mechanism is in operation and for automatically accelerating said press to said predetermined speed upon said transfer mechanism completing an operation.

6. In a hydraulically operated press having dies for operating upon the work and feeding mechanism for passing strips of work step by step therethrough and a pump for supplying driving liquid thereto to drive said press at a predetermined speed, the combination of a magazine for containing a supply of said strips, transfer mechanism for transferring strips from said magazine to said feeding mechanism during predetermined intervals, and means set in action by said feeding mechanism for automatically reducing the volumetric delivery of said pump to thereby decelerate said press during each interval said transfer mechanism is in operation.

7. In a hydraulically operated press having dies for operating upon the work and feeding mechanism for passing strips of work step by step therethrough and a pump for supplying driving liquid thereto to drive said press at a predetermined speed, the combination of a magazine for containing a supply of said strips, transfer mechanism operated in conjunction with said feeding mechanism for transferring strips from said magazine to said feeding mechanism during predetermined intervals, and means operated in conjunction with said transfer mechanism for automatically reducing the volumetric delivery of said pump to thereby decelerate said press during each interval said transfer mechanism is in operation.

8. A press, comprising dies for operating upon the work, feeding mechanism for passing work between said dies, means for actuating said feeding mechanism intermittently to advance a piece of work a predetermined distance during each actuation thereof, a platen for carrying one of said dies, means normally operable for reciprocating said platen alternately with each actuation of said feeding mechanism to thereby complete a cycle of operation, and means actuated in response to said press completing a predetermined number of cycles of operation for preventing said last named means from reciprocating said platen during the next cycle of operation.

9. A press, comprising dies for operating upon the work, feeding mechanism for passing work between said dies, means for actuating said feeding mechanism intermittently to advance a piece of work a predetermined distance during each actuation thereof, a platen for carrying one of said dies, means normally operable for reciprocating said platen alternately with each actuation of said feeding mechanism to thereby complete a cycle of operation, and means actuated in response to the actuation of said feeding mechanism for preventing said last named means from reciprocating said platen during predetermined cycles of operation.

10. A hydraulic press, comprising a pump for supplying liquid thereto to operate the same, feeding mechanism, means for actuating said feeding mechanism intermittently to advance a piece of work a predetermined distance during each actuation thereof, a ram cylinder, a ram fitted in said cylinder for reciprocating a movable die toward and from a stationary die, means normally operable for delivering liquid from said pump to said cylinder to reciprocate said ram each time said feeding mechanism is actuated to thereby complete a cycle of operation, and means operated in response to operation of said feeding mechanism for preventing the delivery of liquid to said ram cylinder during predetermined cycles of operation.

11. In a hydraulic press having a ram fitted in a ram cylinder for reciprocating a movable die toward and from a stationary die and feeding mechanism actuated intermittently for advancing a piece of work a predetermined distance during each actuation thereof and in which a reciprocation of said ram and an actuation of said feeding mechanism constitutes a normal cycle of operation, the combination of a valve for controlling the delivery of liquid to said cylinder, means for operating said valve, a control chain, and means carried by said chain in a selected position for actuating said valve operating means during predetermined cycles of operation to thereby prevent said ram from reciprocating during certain cycles.

12. In a self-feeding press having dies for operating upon the work, the combination of a gripper frame, a pair of jaws carried by said frame for seizing a piece of work therebetween, operating means for opening and closing said jaws, toggle means including a spring connecting one of said jaws to said operating means and operable beyond dead center and against a positive stop whereby said spring relieves said operating means from all load, and means for reciprocating said gripper frame.

13. In a self-feeding press having dies for operating upon the work, the combination of a gripper frame, a pair of jaws carried by said frame for seizing a piece of work therebetween, a hydraulic motor for opening and closing said jaws, spring toggle means for holding said jaws closed and thereby relieving said hydraulic motor from all load, and means for reciprocating said gripper frame.

14. In a self-feeding press having dies for operating upon the work, the combination of a gripper frame, means for reciprocating said frame, a jaw fixed to said frame for engaging a piece of work upon one side thereof, a jaw pivoted to said frame for engaging said work upon the other side thereof, a shaft journaled in said frame, a lever carried by said shaft, a collapsible link pivoted to said lever and to said pivoted jaw, a spring carried by said link, and means for rotating said shaft in one direction to move said pivoted jaw away from said fixed jaw and for rotating it in the opposite direction until the pivoted connection between said link and said lever passes dead center and said spring prevents said pivoted jaw from moving away from said fixed jaw and removes all load from said shaft rotating means.

15. In a self feeding press having dies for operating upon the work, the combination of a support, a plurality of work engaging means carried by said support for engaging the work upon the same edge thereof, means for reciprocating said work engaging means upon said support to thereby feed the work step by step endwise through said press, means for opening and closing said work engaging means in timed relation to the reciprocation thereof, and means for adjusting the position of said support relatively to the path of said work to enable said press to operate upon work of different widths.

16. A self feeding press, comprising a platen for moving a movable die toward and from a stationary die, means for reciprocating said platen, feeding mechanism for feeding work step by step through said press and having means for engaging said work, means for driving said press at a predetermined speed, means for decelerating said press, and means responsive to the completion of a predetermined number of steps by said feeding mechanism for automatically controlling the operation of said decelerating means.

17. A self feeding press, comprising a platen for moving a movable die toward and from a stationary die, means for reciprocating said platen, feeding mechanism for feeding work step by step through said press and having means for engaging said work, means for driving said press at a predetermined speed, means for preventing said platen from reciprocating, and means responsive to the completion of a predetermined number of steps by said feeding mechanism for automatically controlling the operation of said last named means.

18. A self feeding press, comprising a platen for moving a movable die toward and from a stationary die, means for reciprocating said platen, feeding mechanism for feeding work through said press and having means for engaging said work, transfer mechanism for moving work into position to be engaged by said engaging means, means for driving said press at a predetermined speed, means for decelerating said press, means for preventing said platen from reciprocating, and a control chain operated by the operation of said work engaging means for automatically controlling the operation of said last named means, said decelerating means and said transfer mechanism.

19. In a self-feeding press having dies for operating upon the work, the combination of feeding mechanism for advancing strips of work through said press intermittently, transfer mechanism for moving said strips into position to be engaged by said feeding mechanism, an endless control chain operated in synchronism with said feeding mechanism, and one or more control attachments carried by said chain to control said transfer mechanism, the length of said chain or the distance between adjacent attachments thereon being determined by the number of operations to be performed upon each strip by said press.

20. The combination, with a self-feeding press having dies for operating upon the work, of a magazine containing a supply of substantially identical work pieces and comprising guides arranged upon opposite sides thereof and converging to form a delivery opening of substantially the same size as said work pieces, and means for advancing said work pieces toward said delivery opening whereby each work piece will be accurately positioned in respect to said press upon passing through said opening.

21. The combination, with a self-feeding press having dies for operating upon the work, of a magazine, for containing pieces of work to be fed through said press, comprising a frame, a platform for supporting said work carried by said frame and guided thereby for vertical reciprocation, means for raising and lowering said platform, and means for controlling the aforesaid means to maintain the top of the work in said magazine at a predetermined level.

22. The combination, with a self-feeding press having dies for operating upon the work, of a magazine, for containing pieces of work to be fed through said press, comprising a frame, a platform for supporting said work carried by said frame and guided thereby for vertical reciprocation, a hydraulic motor for raising and lowering said platform, and means for controlling the operation of said motor to maintain the top of the work in said magazine at a predetermined level.

23. The combination, with a self-feeding press having dies for operating upon the work, of a magazine, for containing strips of work to be fed through said press, comprising a frame, a platform for supporting a stack of said strips carried by said frame and guided thereby for vertical reciprocation, means for raising and lowering said platform, abutments for holding one edge and one end of each of said strips in a predetermined position, and guides for urging said strips against said abutments as said platform rises.

24. The combination, with a self-feeding press having dies for operating upon the work, of a magazine, for containing strips of work to be fed through said press, comprising a frame, a platform for supporting a stack of said strips carried by said frame and guided thereby for vertical reciprocation, means for raising and lowering said platform, abutments for holding one edge and one end of each of said strips in a predetermined position, guides for urging said strips against said abutments as said platform rises, and means for adjusting said magazine to receive strips of different sizes.

25. In a press having dies for operating upon the work and feeding mechanism for passing strips of work therethrough, the combination of a magazine for supporting a supply of said strips in a vertical stack, means for automatically transferring strips from said magazine to said feeding mechanism, and hydraulic means for elevating said stack to move the top strip thereof into position to be engaged by said transferring means.

26. In a press having dies for operating upon the work and feeding mechanism for passing strips of work step by step therethrough and hydraulic means for operating said feeding mechanism, the combination of a magazine for supporting a supply of said strips in a vertical stack, means operated by said hydraulic means for automatically transferring strips from said magazine to said feeding mechanism, and means for elevating said stack to move the top strip thereof into position to be engaged by said transferring means.

27. In a press having dies for operating upon the work and feeding mechanism for passing strips of work therethrough and hydraulic means for operating said feeding mechanism, the combination of a magazine for supporting a supply of said strips in a vertical stack, means operated by said hydraulic means for automatically transferring strips from said magazine to said feeding mechanism, means for elevating said stack to move the top strip into position be engaged by said transferring means, and means responsive to variations in the elevation of the top of said supply of strips in said magazine for controlling said elevating means.

28. In a press having dies for operating upon the work and feeding mechanism for passing strips of work step by step therethrough and hydraulic means for operating said feeding mechanism, the combination of a magazine for supporting a supply of said strips in a vertical stack, means operated by said hydraulic means for automatically transferring strips from said magazine to said feeding mechanism, and hydraulic means for elevating said stack to move the top strip into position to be engaged by said transferring means.

29. A press, comprising a platen for moving a movable die toward and from a stationary die, means for reciprocating said platen, feeding mechanism having a reciprocating member for feeding pieces of work through said press transversely of the direction of platen movement, means for driving said feeding mechanism, a magazine for containing a supply of elongated pieces of work, and transfer mechanism for moving the front ends only of said pieces transversely of the direction of feed movement into position to be engaged by said reciprocating member.

30. A press, comprising a platen for moving a movable die toward and from a stationary die, hydraulic means for reciprocating said platen, feeding mechanism having a reciprocating member for feeding pieces of work through said press transversely of platen movement, hydraulic means for driving said feeding mechanism, a magazine for containing a supply of pieces of work, and transfer mechanism for moving the front ends only of said pieces from said magazine transversely of feed movement into position to be engaged by said reciprocating member.

31. In a hydraulically operated press having dies for operating upon the work and feeding mechanism for passing strips of work step by step therethrough and a pump for supplying driving liquid to drive said press at a predetermined speed, the combination of a magazine for containing a supply of said strips, transfer mechanism for transferring strips from said magazine to said feeding mechanism during predetermined intervals, and means responsive to the completion of a predetermined number of steps by said feeding mechanism for automatically reducing the volumetric delivery of said pump to thereby decelerate said press during each interval said transfer mechanism is in operation and for automatically increasing the volumetric delivery of said pump upon said transfer mechanism completing its operation to accelerate said press to said predetermined speed.

32. In a press having dies for operating upon the work and feeding mechanism for passing strips of work step by step therethrough and means for driving said press at a predetermined speed, the combination of a magazine for containing a supply of said strips, transfer mechanism operated by said feeding mechanism for transferring strips from said magazine to said feeding mechanism during predetermined intervals, and means responsive to the completion of a predetermined number of steps by said feeding mechanism and operated in conjunction with said transfer mechanism for automatically decelerating said press during each interval said transfer mechanism is in operation.

33. A hydraulic press, comprising dies for operating upon the work, a pump for supplying liquid to said press to operate the same, feeding mechanism, means for actuating said feeding mechanism intermittently to advance a piece of work a predetermined distance during each actuation thereof, a ram cylinder, a ram fitted in said cylinder, means normally operable for delivering liquid from said pump to said cylinder to reciprocate said ram each time said feeding mechanism is actuated to thereby complete a cycle of operation, and means actuated in response to the actuation of said feeding mechanism for preventing the delivery of liquid to said ram cylinder during predetermined cycles of operation.

34. In a press having a platen for reciprocating a movable die toward and from a stationary die and feeding mechanism actuated intermittently for advancing a piece of work a predetermined distance during each actuation thereof and in which a reciprocation of said platen and an actuation of said feeding mechanism constitutes a cycle of operation, the combination of means for preventing said platen from reciprocating, a control chain, and means carried by said chain in a selected position for operating said last named means during certain cycles of operation to thereby prevent said ram from reciprocating during predetermined cycles of operation.

35. In a press having a platen for reciprocating a movable die toward and from a stationary die and feeding mechanism actuated intermittently for advancing a piece of work a predetermined distance during each actuation thereof and in which a reciprocation of said platen and an actuation of said feeding mechanism constitutes a cycle of operation, the combination of means for preventing said platen from reciprocating, a control chain actuated in response to the actuation of said feeding mechanism, and means carried by said chain in a selected position for operating said last named means during certain cycles of operation to thereby prevent said ram from reciprocating during predetermined cycles.

36. In a hydraulic press having a ram fitted in a ram cylinder for reciprocating a movable die toward and from a stationary die and feeding mechanism actuated intermittently for advancing a piece of work a predetermined distance during each actuation thereof and in which a reciprocation of said ram and an actuation of said feeding mechanism constitutes a cycle of operation, the combination of a valve for controlling the delivery of liquid to said cylinder, means for operating said valve, a control chain actuated in response to the actuation of said feeding mechanism, and means carried by said chain in a selected position for actuating said valve operating means during predetermined cycles of operation to thereby prevent said ram from reciprocating during certain cycles.

37. A self feeding press, comprising a platen for moving a movable die toward and from a stationary die, means for reciprocating said platen, feeding mechanism for feeding work through said press and having means for engaging said work, means for driving said press at a predetermined speed, means for decelerating said press, and a control chain operated by the operation of said work engaging means for automatically controlling the operation of said decelerating means.

38. The combination, with a self-feeding press having dies for operating upon the work, of a magazine, for containing strips of work to be fed through said press, comprising a frame, a platform for supporting a stack of said strips carried by said frame and guided thereby for vertical reciprocation, means for raising and lowering said platform, abutments for holding one edge and one end of each of said strips in a predetermined position, guides for urging said strips against said abutments as said platform rises, and means for controlling the aforesaid means to maintain the top of the work in said magazine at a predetermined level.

39. The combination with a self-feeding press having dies for operating upon the work of a magazine containing a stack of identical work pieces and having a delivery opening of substantially the same size as the work pieces, means to successively receive the work pieces at the delivery opening and transfer them to the press, and means to feed the stack progressively toward the delivery opening; said magazine comprising a set of guides which enclose the work pieces and which converge toward the delivery opening to accurately locate each work piece as it reaches the point of delivery to the transfer means.

40. In a press having dies for operating upon the work and feed mechanism for passing strips of work step by step between said dies, the combination of a magazine for supporting a supply of work strips, and transfer mechanism for transferring the contents of said magazine strip by strip to said press and including means for engaging the outermost strip in said magazine and mechanism for moving said engaging means in a direction to lift said strip from said magazine and in another direction to move said strip to a position to be engaged by said feed mechanism.

41. In a press having dies for operating upon the work and feed mechanism for passing strips of work step by step between said dies, the combination of a magazine for supporting a supply of work strips, and transfer mechanism for transferring the contents of said magazine strip by strip to said press and including means for engaging the outermost strip in said magazine, mechanism for moving said engaging means in a direction to lift said strip from said magazine and in another direction to move said strip to a position to be engaged by said feed mechanism, and means responsive to said strip reaching a position to be engaged by said feed mechanism for releasing it from said engaging means.

42. In a press having dies for operating upon the work, feed mechanism for passing strips of work step by step between said dies and hydraulic means for operating said feed mechanism, the combination of a magazine for supporting a supply of work strips, and transfer mechanism operated by said hydraulic means for transferring the contents of said magazine strip by strip to said press and including means for engaging the outermost strip in said magazine, mechanism for moving said engaging means in a direction to lift said strip from said magazine and in another direction to move said strip to a position to be engaged by said feed mechanism, and means responsive to said strip reaching a position to be engaged by said feed mechanism for releasing it from said engaging means.

43. The combination, with a press having dies for operating upon the work, a platen for carrying one of said dies and means for reciprocating said platen, of feed mechanism having a reciprocating member for advancing pieces of work step by step through said press transverse to the axis of said platen, means for driving said feed mechanism, a magazine for supporting a supply of pieces of work in a vertical stack, and transfer mechanism for transferring the contents of said magazine piece by piece to said press and including means for engaging the top piece in said stack and mechanism for moving said engaging means upward to lift said piece from said stack and laterally to move said piece to a position to be engaged by said reciprocating member.

44. The combination, with a press having dies for operating upon the work, a platen for carrying one of said dies and means for reciprocating said platen, of feed mechanism having a reciprocating member for advancing pieces of work step by step through said press transverse to the axis of said platen, means for driving said feed mechanism, a magazine for supporting a supply of pieces of work in a vertical stack, and transfer mechanism driven in synchronism with said feed mechanism for transferring the contents of said magazine piece by piece to said press and including means for engaging the top piece in said stack and mechanism for moving said engaging means upward to lift said piece from said stack and laterally to move said piece to a position to be engaged by said reciprocating member.

45. The combination, with a press having dies for operating upon the work, a platen for carrying one of said dies and means for reciprocating said platen, of feed mechanism having a reciprocating member for advancing pieces of work step by step through said press transverse to the axis of said platen, means for driving said feed mechanism, a magazine for supporting a supply of pieces of work in a vertical stack, and transfer mechanism driven in synchronism with said feed mechanism for transferring the contents of said magazine piece by piece to said press and said magazine piece by piece to said press and including means for engaging the top piece in said stack, mechanism for moving said engaging means upward to lift said piece from said stack and laterally to move said piece to a position to be engaged by said reciprocating member, and means responsive to said piece of work reaching said position for releasing it from said engaging means.

WALTER FERRIS.
JOHN P. FERRIS.
GEORGE L. HEIDEN.